(12) United States Patent
Rafi et al.

(10) Patent No.: US 9,415,340 B2
(45) Date of Patent: Aug. 16, 2016

(54) FILTER STRUCTURE FOR REMOVING CONTAMINANTS FROM STREAM OF FLUID

(71) Applicant: American Air Filter Company, Inc., Louisville, KY (US)

(72) Inventors: Mohammad Usman Rafi, Fenham (GB); Nathaniel Nance, La Grange, KY (US)

(73) Assignee: American Air Filter Company Inc., Louisville, KY (US)

( * ) Notice: Subject to any disclaimer, the term of this patent is extended or adjusted under 35 U.S.C. 154(b) by 157 days.

(21) Appl. No.: 14/486,497

(22) Filed: Sep. 15, 2014

(65) Prior Publication Data

US 2015/0033687 A1    Feb. 5, 2015

Related U.S. Application Data

(62) Division of application No. 13/176,464, filed on Jul. 5, 2011, now Pat. No. 8,834,591.

(60) Provisional application No. 61/388,971, filed on Oct. 1, 2010.

(51) Int. Cl.
*B01D 46/12*    (2006.01)
*B01D 46/00*    (2006.01)
(Continued)

(52) U.S. Cl.
CPC .............. *B01D 46/12* (2013.01); *B01D 46/002* (2013.01); *B01D 46/0005* (2013.01); *B01D 46/0006* (2013.01); *B01D 46/0013* (2013.01); *B01D 46/0021* (2013.01); *B01D 46/0023* (2013.01); *B01D 46/10* (2013.01); *B01D 46/125* (2013.01); *B01D 46/522* (2013.01);
*B01D 2265/029* (2013.01); *B01D 2265/06* (2013.01); *B01D 2267/30* (2013.01); *B01D 2267/40* (2013.01);
(Continued)

(58) Field of Classification Search
CPC ........... B01D 46/0005; B01D 46/0013; B01D 46/002; B01D 46/0021; B01D 46/12; B01D 46/125; B01D 46/521; B01D 46/522; B01D 2265/06; B01D 2267/30; B01D 2267/40; B01D 2275/206; B01D 2277/20; B01D 2279/60
See application file for complete search history.

(56) References Cited

U.S. PATENT DOCUMENTS 2,433,544 A   12/1947   Blake et al.
3,383,841 A    5/1968   Olson et al.
(Continued)

FOREIGN PATENT DOCUMENTS

EP   1790409   5/2007
GB   2454306   5/2009
(Continued)

OTHER PUBLICATIONS

AAF International, ASC Intake Filter System—State of the art in Turbine Intake Filtration, 6 pages.
(Continued)

*Primary Examiner* — Robert Clemente
(74) *Attorney, Agent, or Firm* — Middleton Reutlinger; John F. Salazar; Chad D. Bruggeman

(57) ABSTRACT

Various methods and apparatus are disclosed that relate to one or more aspects of a filter structure that may remove contaminants from a stream of fluid. In various aspects the filter structure includes a front portion having a first orientation and a rear portion having a second orientation unique from the first orientation.

20 Claims, 17 Drawing Sheets

(51) Int. Cl.
*B01D 46/10* (2006.01)
*B01D 46/52* (2006.01)

(52) U.S. Cl.
CPC ....... *B01D 2275/206* (2013.01); *B01D 2277/20* (2013.01); *B01D 2279/60* (2013.01)

(56) References Cited

U.S. PATENT DOCUMENTS

| | | |
|---|---|---|
| 4,187,091 A | 2/1980 | Durre et al. |
| D260,422 S | 8/1981 | Husted |
| 4,331,459 A | 5/1982 | Copley |
| 4,359,330 A | 11/1982 | Copley |
| 4,364,751 A | 12/1982 | Copley |
| RE32,185 E | 6/1986 | Copley |
| D288,230 S | 2/1987 | Thatcher |
| 5,401,285 A | 3/1995 | Gillingham et al. |
| 5,575,826 A | 11/1996 | Gillingham et al. |
| D376,640 S | 12/1996 | Kloster |
| 5,683,479 A | 11/1997 | Gillingham et al. |
| 5,775,988 A | 7/1998 | Eakin |
| 6,136,077 A | 10/2000 | Walker |
| D455,826 S | 4/2002 | Gillingham et al. |
| 6,676,721 B1 | 1/2004 | Gillingham et al. |
| 6,796,100 B1 | 9/2004 | Venezia |
| 6,800,117 B2 | 10/2004 | Barris et al. |
| 6,872,237 B2 | 3/2005 | Gillingham et al. |
| 6,875,256 B2 | 4/2005 | Gillingham et al. |
| 6,908,494 B2 | 6/2005 | Gillingham et al. |
| 7,090,711 B2 | 8/2006 | Gillingham et al. |
| D528,646 S | 9/2006 | Stout, Jr. |
| D537,931 S | 3/2007 | Kashimura |
| D538,917 S | 3/2007 | Kashimura |
| 7,338,544 B2 | 3/2008 | Sporre et al. |
| D571,450 S | 6/2008 | Brown |
| 7,625,419 B2 | 12/2009 | Nelson et al. |
| D620,585 S | 7/2010 | Adair et al. |
| 8,349,044 B2 | 1/2013 | Raether |
| 8,382,869 B2 | 2/2013 | Jarrier et al. |
| 8,425,671 B2 | 4/2013 | Mann et al. |
| 8,444,748 B2 | 5/2013 | Gillingham et al. |
| 8,673,040 B2 | 3/2014 | Handley et al. |
| 8,721,756 B2 | 5/2014 | Handley et al. |
| 8,834,591 B2 | 9/2014 | Rafi et al. |
| 8,951,321 B2 | 2/2015 | Gillingham et al. |
| 2004/0103626 A1 | 6/2004 | Warth et al. |
| 2006/0277871 A1 | 12/2006 | Gillingham et al. |
| 2009/0107337 A1 | 4/2009 | Vu |
| 2009/0193773 A1 | 8/2009 | Sundvik et al. |
| 2011/0265434 A1 | 11/2011 | Polizzi et al. |

FOREIGN PATENT DOCUMENTS

| | | |
|---|---|---|
| WO | 2008083536 | 7/2008 |
| WO | 2008099323 | 8/2008 |

OTHER PUBLICATIONS

Korean Intellectual Property Office; International Search Report and the Written Opinion of the International Searching Authority, of the Declaration; Search Report and Written Opinion for PCT/US2011/053627; Apr. 30, 2012, pp. 1-9; Korean Intellectual Property Office; Korea.

FILTER STRUCTURE FOR REMOVING CONTAMINANTS FROM STREAM OF FLUID

CROSS-REFERENCE TO RELATED DOCUMENTS

This application is a divisional application of and claims priority and benefit under 35 U.S.C. §121 to copending U.S. patent application Ser. No. 13/176,464, filed on Jul. 5, 2011, which claims priority and benefit under 35 U.S.C. §119(e) to the following Provisional Patent Application Ser. No. 61/388,971, filed Oct. 1, 2010 and entitled "Filter Structure for Removing Contaminants from Stream of Fluid", which are incorporated herein by reference.

TECHNICAL FIELD

The present invention is directed generally to aspects of a filter structure. More particularly, various inventive methods and apparatus disclosed herein relate to one or more aspects of a filter structure for removing one or more contaminants from a stream of fluid such as, for example, removing contaminants from a stream of air supplied to gas turbines or other smooth intake flow machinery.

BACKGROUND

Filters are generally used to remove one or more contaminants from a stream of fluid, including gas and liquid. For example, a bank of filters may be provided in a gas filtering system upstream of a gas turbine in order to remove contaminants from a stream of fluid being supplied to the gas turbine. Over a period of time the filters become loaded with contaminants that have been removed from the stream of fluid by the filters. When the contaminant buildup on the upstream side of the filters causes the fluid flow through the filters to be restricted by a predetermined amount, the filters are typically replaced or cleaned.

Some gas filtering systems may utilize self cleaning of the filters to periodically remove contaminants from the filters. Such self cleaning systems may utilize pulse back cleaning to periodically discharge bursts of air into the filters in an opposite direction from the typical flow of fluid, thereby causing reversal of the fluid flow moving through the filters and a sudden change in pressure causing the removal of contaminants accumulated on the upstream side of the filters. The dislodged contaminants may be drawn into a secondary cleaning air circuit on the upstream side of the filters to minimize re-entrainment of the dislodged contaminants back into the filters. The pulse back cleaning decreases the amount of contaminants on the upstream side of the filters and resultantly reduces the amount of restriction of the fluid flow. The pulse back cleaning accordingly reconditions the filters for continued, substantially uninterrupted service and increases the interval for servicing the filters. One such gas filtering system that utilizes a bank of filters and pulse back cleaning is the ASC III Intake Filter System available from AAF International of Louisville, Ky.

SUMMARY

The present disclosure is directed to inventive methods and apparatus for aspects of a filter structure, and, more specifically, one or more aspects of a filter structure for removing one or more contaminants from a stream of fluid. For example, some aspects of the present disclosure are directed to a filter structure for removing contaminants from a stream of air supplied to gas turbines or other smooth intake flow machinery and other aspects are directed to a gas filtering system containing a plurality of filter structures.

Generally, in one aspect, a filter structure for removing contaminants from a stream of fluid is provided. The filter structure includes a front filter portion and a rear filter portion. The front filter portion has a front frame supporting a front first filter and a front second filter. The front first filter and the front second filter are in substantially parallel spaced relation to one another and define a substantially parallel front clean air passageway therebetween. The front frame includes a front end plate extending between the front first filter and the front second filter proximal a first filter first end of the front first filter and a second filter first end of the front second filter. The rear filter portion has a rear frame supporting a rear first filter and a rear second filter. The rear first filter extends from adjacent a first filter second end of the front first filter and the rear second filter extends from adjacent a second filter second end of the front second filter. The rear first filter and the rear second filter are in diverging spaced relation with one another as they extend from adjacent respective of the front first filter and the front second filter and define a substantially diverging rear clean air passageway therebetween. The rear clean air passageway and the front clean air passageway are in flow communication with one another. The rear frame includes a rear end plate having a rear end plate opening in flow communication with the rear clean air passageway. The rear end plate is configured for interfacing with a clean air intake opening.

In some embodiments the front frame and the rear frame contain at least some unified structure. In some versions of those embodiments the front first filter and the rear first filter contain at least some unified structure.

In some embodiments the front filter portion and the rear filter portion are separable from one another. In some versions of those embodiments the front frame portion includes a second front end plate extending between the first filter second end and the second filter second end. The second front end plate may include a second front end plate opening therein in flow communication with the front clean air passageway and may be configured to removably engage the rear frame.

In some embodiments the front frame includes a front upper frame structure and a front lower frame structure sandwiching the front first filter and the front second filter.

In some embodiments the front first filter and the front second filter share a substantially similar first material configuration and the rear first filter and the rear second filter share a substantially similar second material configuration distinct from the first material configuration. In some versions of those embodiments the first material configuration has a first average pleat density and the second material configuration has a second average pleat density. In certain embodiments the second average pleat density may optionally be at least fifteen percent more dense than the first average pleat density.

In some embodiments the front first filter and the front second filter share a substantially similar first length and the rear first filter and the rear second filter share a substantially similar second length distinct from the first length. In some versions of those embodiments the first length is at least fifteen percent greater than the second length.

Generally, in another aspect, a filter structure for removing contaminants from a stream of fluid is provided and includes a generally rectangular front filter portion and a generally trapezoidal rear filter portion. The front filter portion includes front frame structure supporting a first front filter and a second front filter in substantially parallel spaced relation to one another. The front frame structure, the first front filter, and the second front filter substantially surround a front clean air passageway. The rear filter portion includes rear frame structure supporting a first rear filter and a second rear filter in substantially divergent spaced relation with one another. A less spaced end of the first rear filter and the second rear filter is proximal the front filter portion and a more spaced end of the first rear filter and the second rear filter is distal the front filter portion. The rear frame structure, the first rear filter, and the second rear filter substantially surround a rear clean air passageway. The rear clean air passageway is in communication with the front clean air passageway and in communication with a filter structure outlet between the first rear filter and the second rear filter proximal the more spaced end of the first rear filter and the second rear filter.

In some embodiments the front first filter and the rear first filter contain at least some unified structure. In some versions of those embodiments the front frame and the rear frame contain at least some unified structure.

In some embodiments the front first filter and the front second filter share a substantially similar first material configuration and the rear first filter and the rear second filter share a substantially similar second material configuration distinct from the first material configuration. In some versions of those embodiments the first material configuration has a first average pleat density and the second material configuration has a second average pleat density. In certain embodiments the second average pleat density may optionally be at least ten percent more dense than the first average pleat density. In other certain embodiments the second average pleat density may optionally be at least twenty percent more dense than the first average pleat density. In some versions of those embodiments the first material configuration has a first grade and the second material configuration has a second grade distinct from the first grade. In some versions of those embodiments the front filter portion and the rear filter portion are separable from one another.

Generally, in another aspect a filter structure for removing contaminants from a stream of fluid includes a front filter portion and a rear filter portion. The front filter portion defines a front clean air passageway therein and has a first front filter and a second front filter flanking the front clean air passageway. The first front filter and the second front filter are at a first orientation relative to one another. The rear filter portion is coupled to the front filter portion and defines a rear clean air passageway therein. The rear clean air passageway is in flow communication with the front clean air passageway and the rear filter portion has a first rear filter and a second rear filter flanking the rear clean air passageway. The first rear filter and the second rear filter are at a second orientation relative to one another that is distinct from the first orientation. The front first filter and the front second filter share a substantially similar first average pleat density and the rear first filter and the rear second filter share a substantially similar second average pleat density distinct from the first average pleat density.

In some embodiments the second average pleat density is at least fifteen percent more dense than the first average pleat density. In some embodiments the second average pleat density is at least twenty-five percent more dense than the first average pleat density. In some embodiments the front first filter portion and the rear first filter portion contain at least some unified structure.

In some embodiments the first orientation is a substantially parallel orientation.

In some embodiments the second orientation is a diverging orientation and the first rear filter and the second rear filter are more proximal one another adjacent the coupling between the front filter portion and the second filter portion.

Generally, in another aspect a fluid filtering system is provided. The fluid filtering system includes a plurality of filter structures interposed between an unfiltered fluid intake area and a filtered fluid output area. The filter structures have an air passageway therein flanked by a first side filter portion and a second side filter portion. The air passageway is in communication with the filtered fluid output area. The first side filter portion and the second side filter portion allow communication of fluid therethrough both into and out of the air passageway. The first side filter portion and the second side filter portion have a substantially parallel orientation with respect to one another along a first length and have a substantially diverging orientation with respect to one another along a second length. The first length is more distal the filtered fluid output area than the second length. Along the second length the first side filter portion and the second side filter portion become more divergent as they become more proximal the filtered fluid output area.

In some embodiments the first side filter portion includes a front filter portion along the first length that is non-unified with a rear filter portion along the second length.

In some embodiments the first filter and the second filter share a substantially similar first average pleat density along at least a portion of the first length and the first filter and the second filter share a substantially similar second average pleat density along at least a portion of the second length. In certain embodiments the second average pleat density is at least twenty percent more dense than the first average pleat density.

In some embodiments the filter structures are separable into a front filter structure that includes the first length and a rear filter structure that includes the second length.

In some embodiments the fluid filtering system includes at least one secondary air circuit opening provided between two side by side filter structures.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
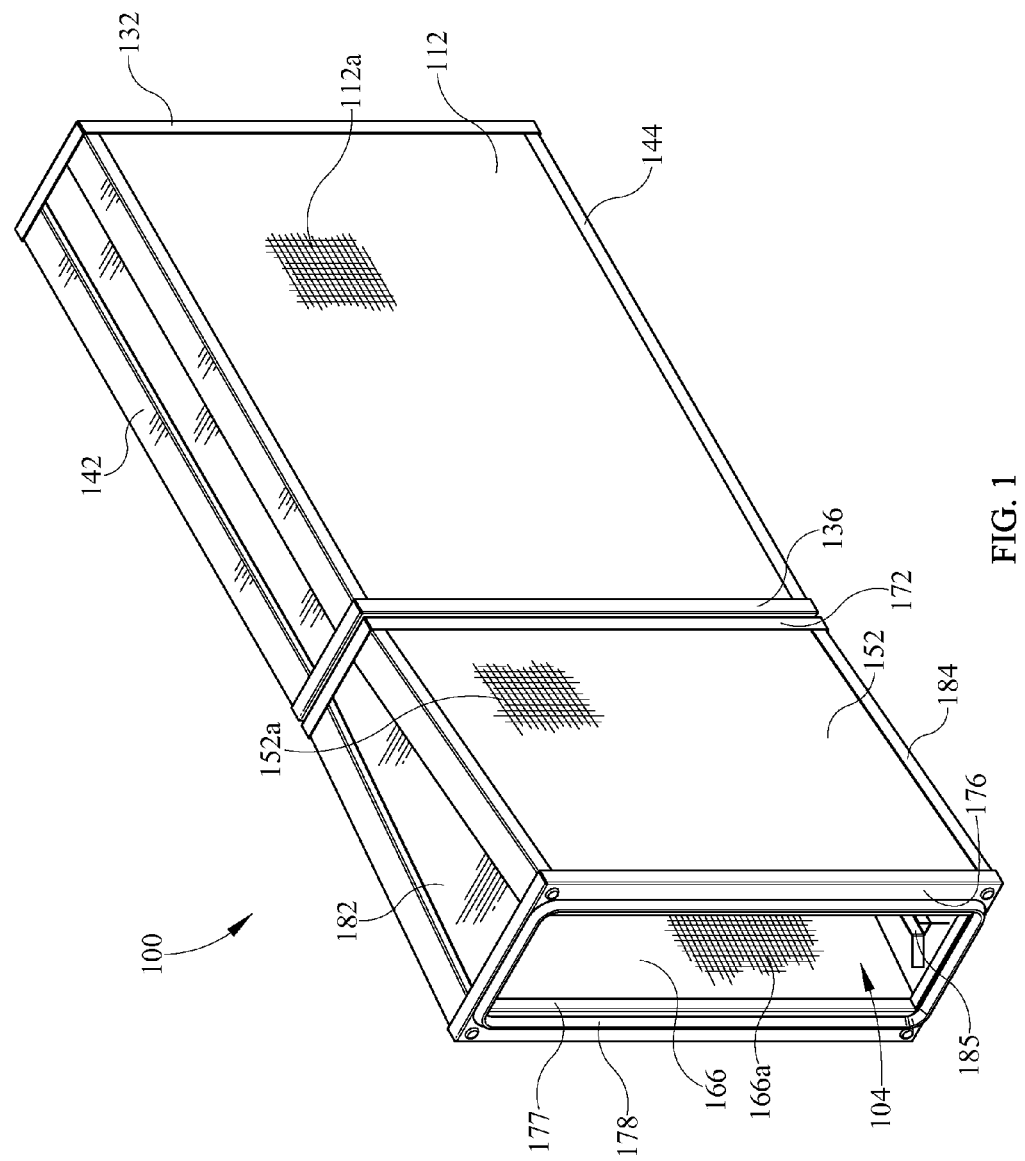
FIG. 1 illustrates an upper rear first side perspective view of a first embodiment of a filter structure.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, the aspects of a fluid filtering system disclosed herein are described in conjunction with a plurality of filter structures that are arranged in a specific fashion and that interface with other structural components of the fluid filtering system in a specific fashion. However, one or more aspects of a fluid filtering system described herein may be implemented with filter structures arranged in alternative configurations and/or with filter structures that interface with other structural components of the fluid filtering system in alternative ways. Also, for example, as described in additional detail herein, filter structures disclosed herein may vary in one or more respects from those specifically depicted herein. Implementation of these and other variations is contemplated without deviating from the scope or spirit of the claimed invention.

In FIG. 1 through FIG. 9 various aspects of a first filter structure 100 are depicted. In FIG. 10 through FIG. 13 various aspects of a second filter structure 200 are depicted. In FIG. 14 through FIG. 17 a plurality of the second filter structures 200 are depicted in combination with other aspects of a gas filtering system.

Referring initially to FIG. 1 through FIG. 9, the first filter structure 100 includes a front filter portion 101 and a rear filter portion 103. The terms front and rear are used herein for convenience in describing the first filter structure 100 and the second filter structure 200. Generally speaking, the term front filter portion references a portion of filter structure that will be more proximal to the intake for incoming unfiltered air than the rear filter portion when the filter structure 100 or 200 is installed in a fluid filtering system. Likewise, the term rear filter portion references a portion of filter structure that will be more distal to the intake for incoming unfiltered air than the front filter portion when the filter structure 100 or 200 is installed in a fluid filtering system and that will be more proximal to a clean air intake opening of the fluid filtering system than the front filter portion. In the depicted embodiment, the front filter portion 101 and the rear filter portion 103 are separable from one another as illustrated in the exploded views of FIG. 2 and FIG. 3 and as described in more detail herein.

Figure 2:
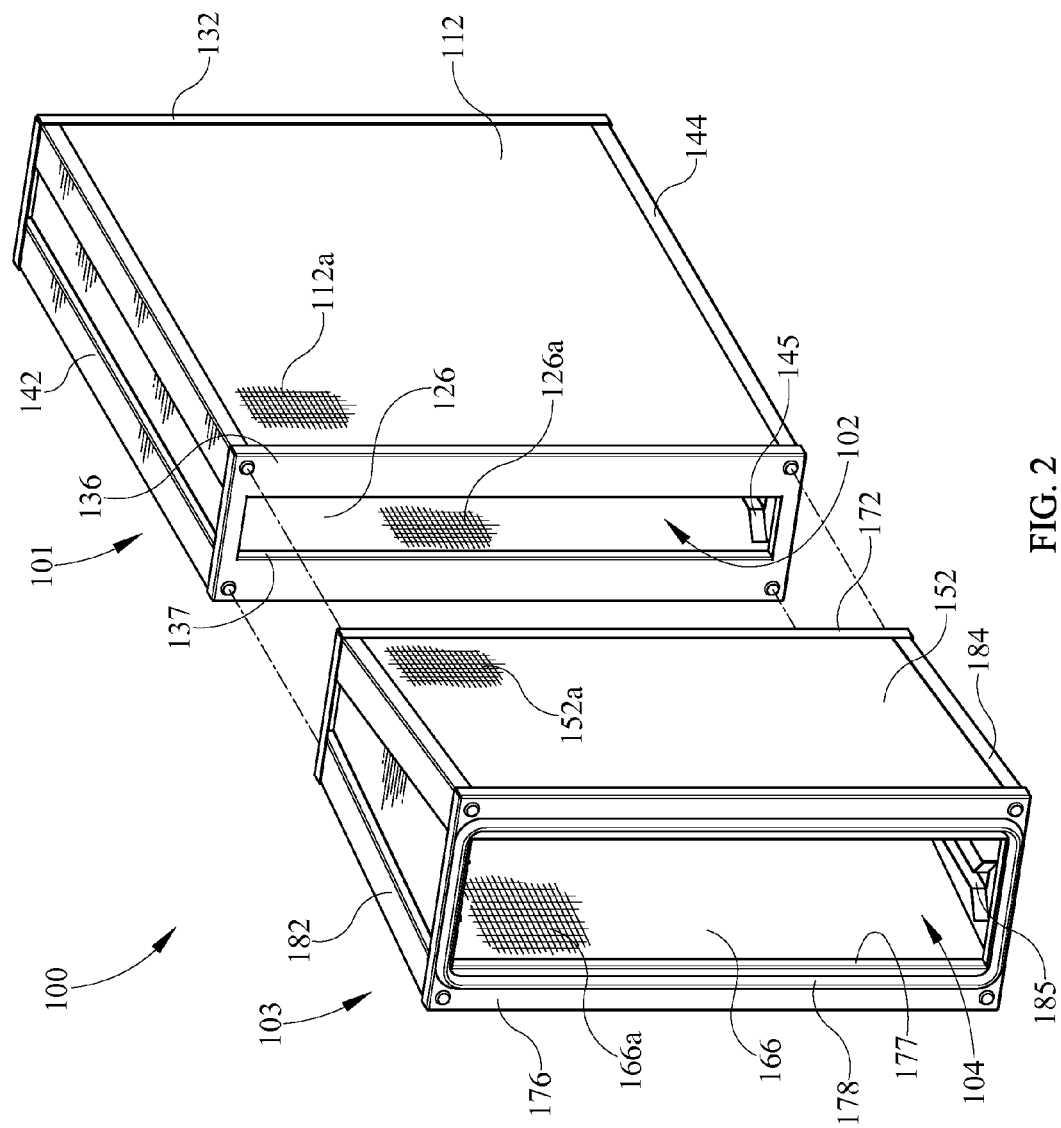
FIG. 2 illustrates an upper rear first side perspective view of the first embodiment of a filter structure of FIG. 1; a rear filter portion of the filter structure is shown exploded away from a front filter portion of the filter structure.
Figure 3:
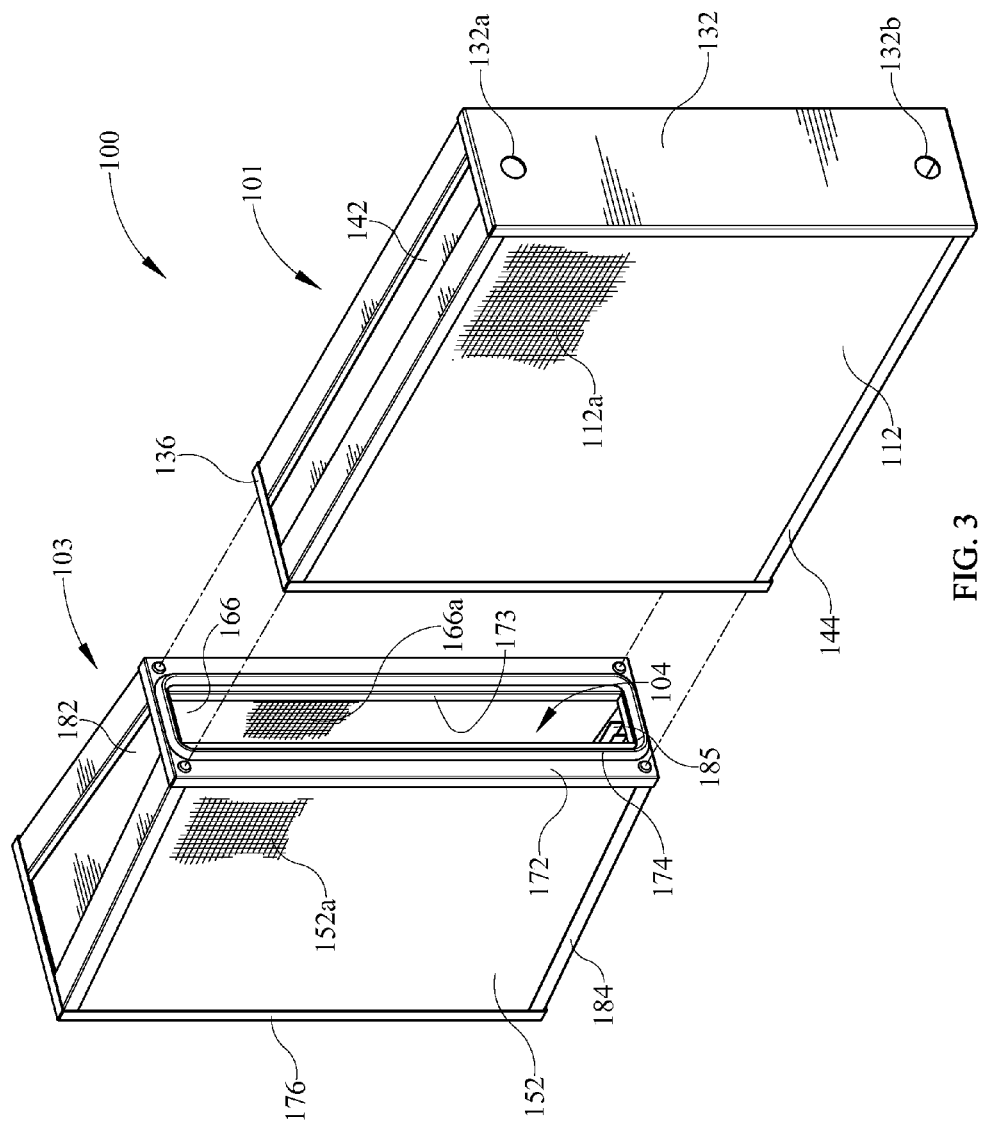
FIG. 3 illustrates an upper front first side perspective view of the first embodiment of a filter structure of FIG. 1; the rear filter portion of the filter structure is shown exploded away from the front filter portion of the filter structure.
Figure 4B:
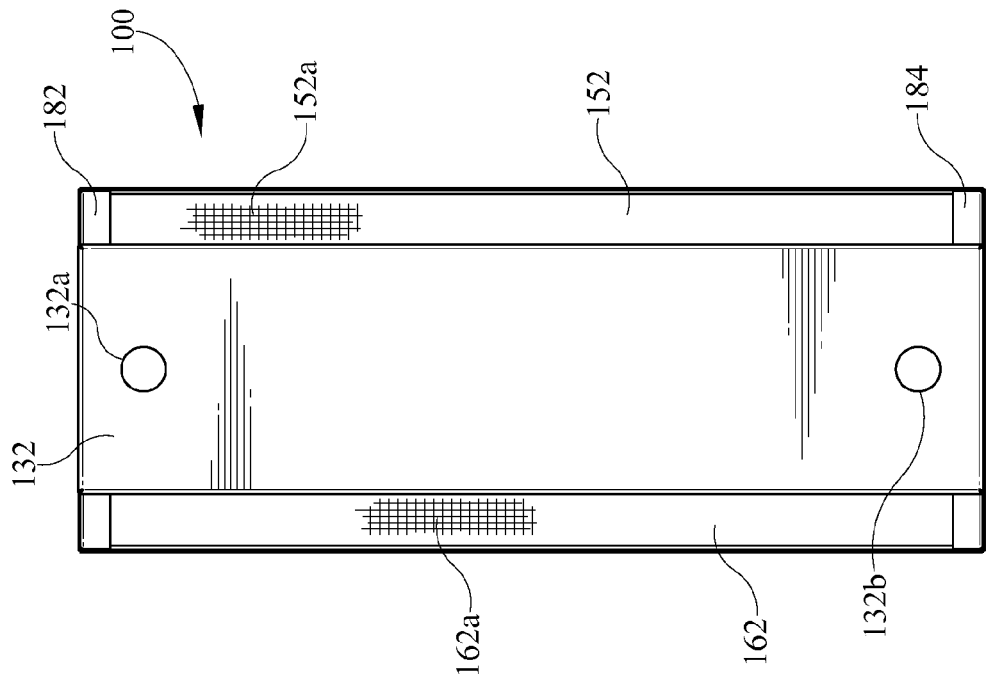
FIG. 4B illustrates a front plan view of the first embodiment of a filter structure of FIG. 1.
Figure 4A:
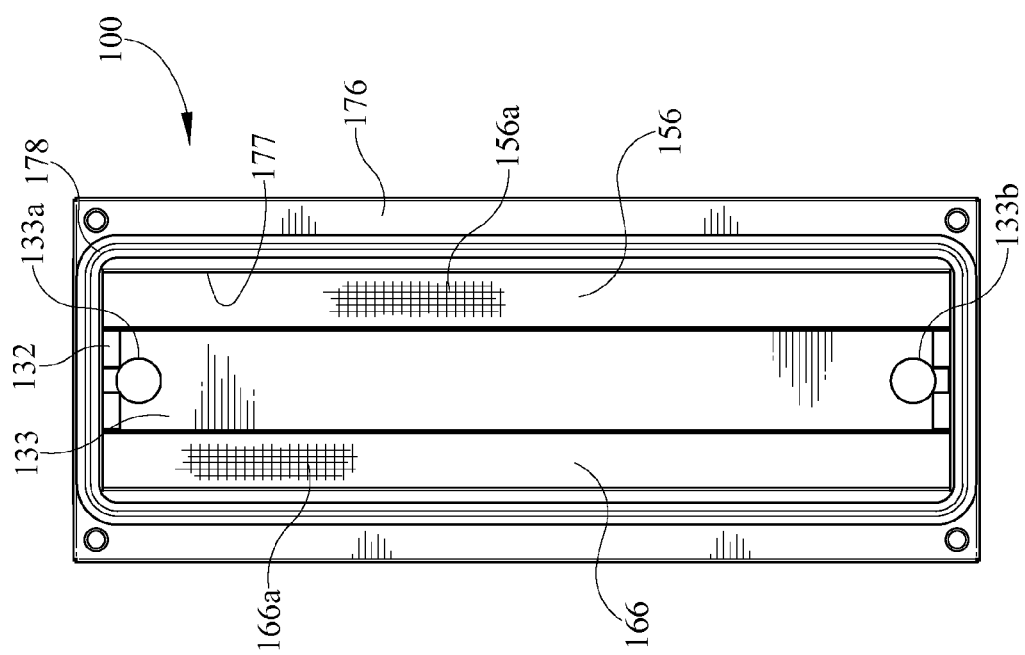
FIG. 4A illustrates a rear plan view of the first embodiment of a filter structure of FIG. 1.
Figure 5:
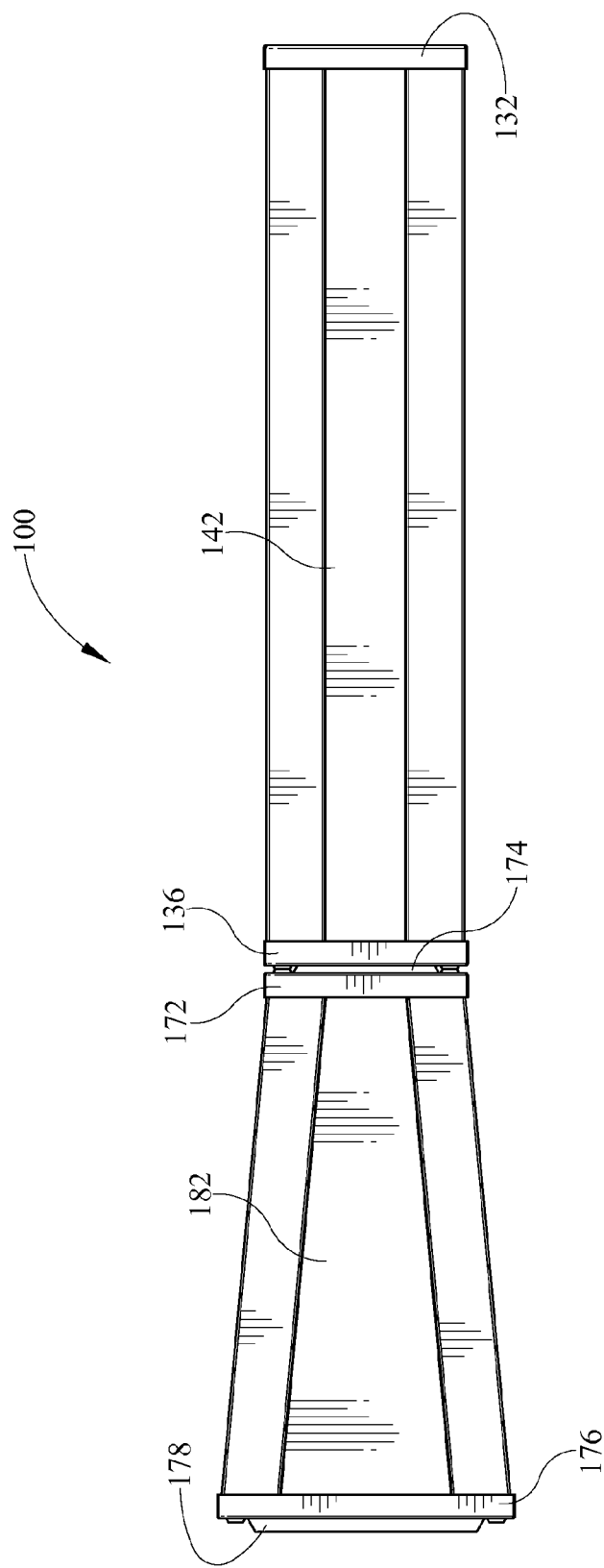
FIG. 5 illustrates a top view of the first embodiment of a filter structure of FIG. 1.
Figure 6:
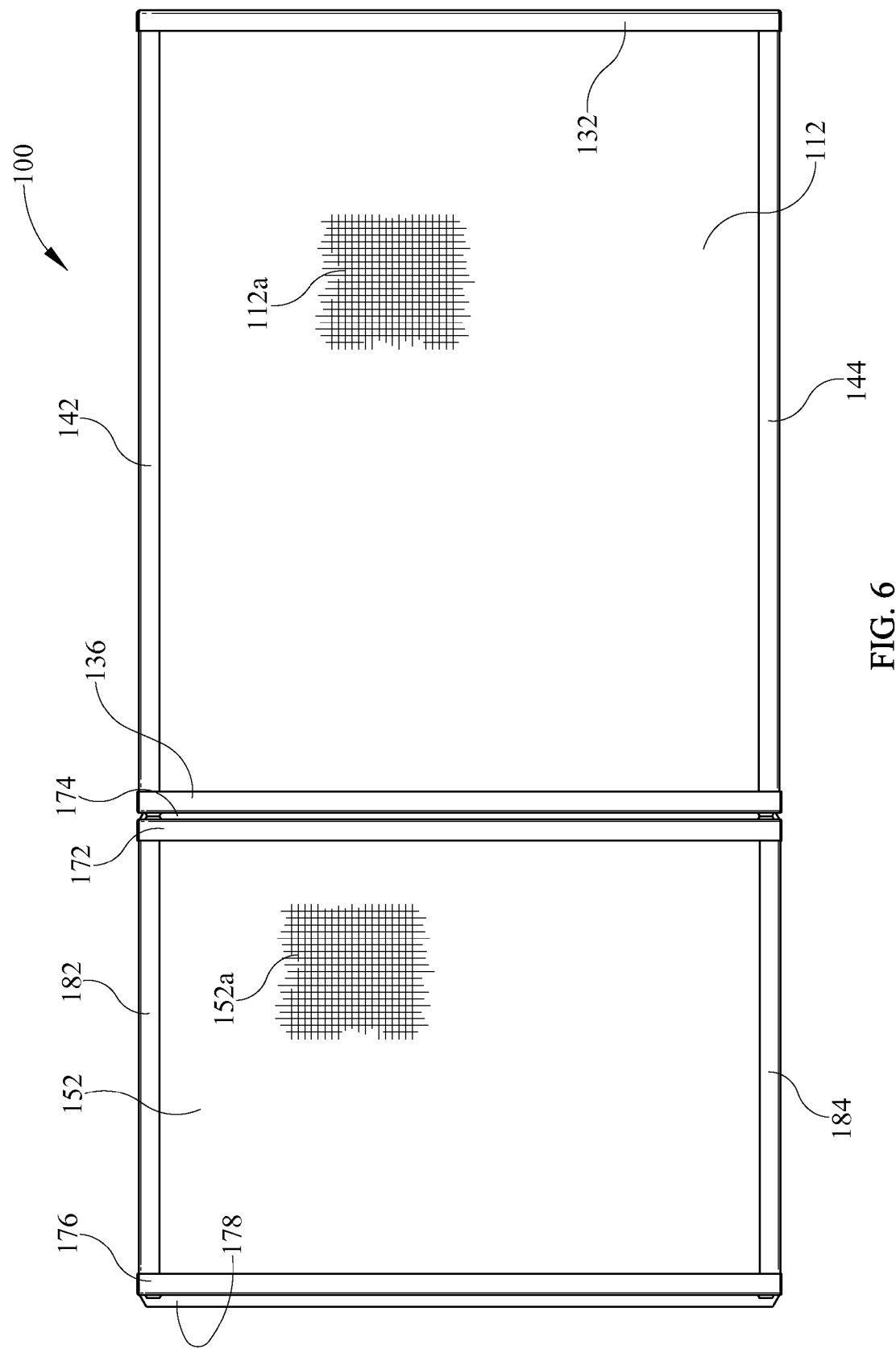
FIG. 6 illustrates a first side view of the first embodiment of a filter structure of FIG. 1.
Figure 7:
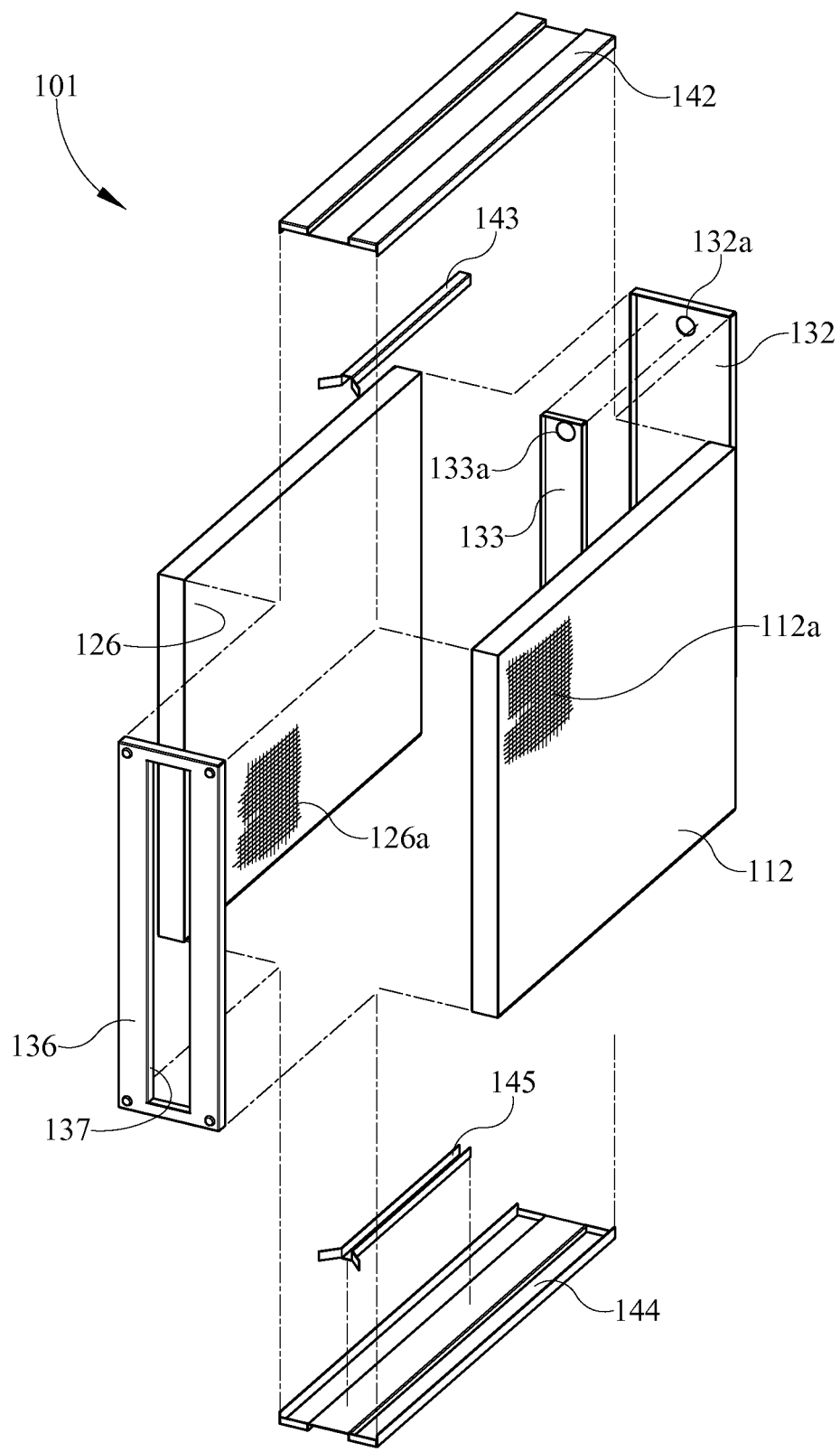
FIG. 7 illustrates an exploded rear upper perspective view of the front portion of the first embodiment of a filter structure of FIG. 1.

The front filter portion 101 includes a front first filter having a front first filter upstream face 112 and a front first filter downstream face (not visible in the Figures) opposite the front first filter upstream face 112. The front filter portion 101 also includes a front second filter having a front second filter upstream face 122 (FIG. 9) and a front second filter downstream face 126 (FIG. 2 and FIG. 7). In the depicted embodiment the front first filter and the front second filter are in substantially parallel spaced relation with respect to one another and may be up to about 4 degrees or more angle of inclination from parallel. It is understood that the term face as used herein does not mandate a planar surface. Rather, a face may be non-planar such as, for example, a face formed by a plurality of filter pleats.

Only small representative sections 112a, 122a, and 126a of respective filtering media of front first filter upstream face 112, front second filter upstream face 122, and front second filter downstream face 126 are shown throughout FIG. 1 through FIG. 9. It should be understood that the entire upstream face and downstream face of the front first filter and front second filter may be constructed of filtering media. Also, it should be understood that the particular depiction of representative sections 112a, 122a, and 126a should not be regarded as limiting the type of filtering media that may be utilized in the filtering structures described herein. In some embodiments the filtering media may be a pleated media and may optionally incorporate longitudinally extending stiffeners interspersed throughout the media to increase rigidity thereof.

Although not depicted for sake of clarity, in some embodiments permeable support material may be provided on the upstream and/or downstream face of the front first filter and/or the front second filter. For example, a wire mesh guard sheet may be provided against upstream face 112 and the downstream face of the first front filter and upstream face 122 and the downstream face 126 of the front second filter. Such a wire mesh guard may sandwich the filters and increase the effective rigidity of the filters.

The front first filter and the front second filter are supported by a front frame. The depicted front frame includes a front upper frame structure 142, a front lower frame structure 144, a front first end plate 132, and a front second end plate 136. The front frame supports the front first filter and the front second filter in parallel spaced relation to one another. The upper frame structure 142 includes a first longitudinal recess on an interior facing surface thereof that receives a top portion of the front first filter and a parallel second longitudinal recess on the interior facing surface that receives a top portion of the front second filter. Likewise, the lower frame structure 144 includes first and second parallel longitudinal recesses (visible in FIG. 7) on an interior surface thereof that receive a lower portion of the front first filter and front second filter, respectively. In the depicted embodiment the upper frame structure 142 and the lower frame structure 144 have substantially the same configuration.

The front first end plate 132 extends over first ends of the front first filter and the front second filter and extends between the front first and second filters. The front first end plate 132 includes two small openings 132a and 132b, but is otherwise solid and non-permeable. As described in additional detail herein, the openings 132a and 132b are utilized to secure the first filter structure 100 in a filtering system and will be substantially blocked when the first filter structure 100 is installed. A front first end plate spacer 133 (FIG. 4A, FIG. 7) may be coupled to the interior facing surface of first end plate 132 and will be interposed between the front second filter downstream face 126 and the front first filter downstream face. Accordingly, when first filter portion 101 is assembled the first ends of the front first filter and the front second filter are interposed between the front first end plate spacer 133 and a peripheral flange of the first end plate 132. The front end plate spacer 133 includes openings 133a and 133b that align with openings 132a and 132b. Openings 133a and 133b are also utilized to secure the first filter structure 100 in a filtering system and will be substantially blocked when the first filter structure 100 is installed.

The front second end plate 136 extends over second ends of the front first filter and the front second filter and extends between the front first and second filters. The front second end plate 136 includes a front second end plate air passageway opening 137 formed therein. The front second end plate air passageway opening 137 has an interiorly extending flange therearound. When first filter portion 101 is assembled, the second ends of the front first filter and the front second filter will be interposed between the interiorly extending flange of the front second end plate air passageway opening 137 and a peripheral flange of the front second end plate 136.

The front first filter, the front second filter, the front upper frame structure 142, the front lower frame structure 144, and the front first end plate 132 surround and define a front air passageway 102 (FIG. 2). The front second end plate air passageway opening 137 provides access to the front air passageway 102 and provides for communication of air to and from the front air passageway 102. As described in additional detail herein, air may also be communicated to or from the front air passageway 102 by moving through the front first filter or the front second filter.

The rear filter portion 103 of first filter structure 100 includes a rear first filter having a rear first filter upstream face 152 and a rear first filter downstream face 156 (FIG. 9) opposite the rear first filter upstream face 152. The rear filter portion 103 also includes a rear second filter having a rear second filter upstream face 162 (FIG. 9) and a rear second filter downstream face 166. In the depicted embodiment the rear first filter and the rear second filter are in a diverging spaced relation with respect to one another and become more divergent as they become more distal the front filter portion 101. In the depicted embodiment the rear first filter and the rear second filter are diverging at approximately a ten degree angle with respect to one another. In alternative embodiments different diverging angular relationships may be utilized in order to, inter alia, achieve desired performance characteristics.

Only small representative sections 152a, 156a, 162a, and 166a of respective filtering media of rear first filter upstream face 152, rear first filter downstream face 156, rear second filter upstream face 162, and rear second filter downstream face 166 are shown throughout FIG. 1 through FIG. 9. It should be understood that the entire upstream face and downstream face of the rear first filter and rear second filter may be constructed of filtering media. Also, it should be understood that the particular depiction of representative sections 152a, 156a, 162a, and 166a should not be regarded as limiting the type of filtering media that may be utilized in the filtering structures described herein. In some embodiments the filtering media may be a pleated media and may optionally incorporate longitudinally extending stiffeners interspersed throughout the media to increase rigidity thereof. In some embodiments permeable support material may be provided on the upstream and/or downstream face of the rear first filter and/or the rear second filter.

The rear first filter and the rear second filter are supported by a rear frame. The depicted rear frame includes a rear upper frame structure 182, a rear lower frame structure 184, a rear first end plate 172, and a rear second end plate 176. The rear frame supports the rear first filter and the rear second filter in diverging spaced relation to one another. The upper frame structure 182 includes a first longitudinal recess on an interior facing surface thereof that receives a top portion of the rear first filter and a divergent second longitudinal recess on the interior facing surface that receives a top portion of the rear second filter. Likewise, the lower frame structure 184 includes first and second diverging longitudinal recesses (visible in FIG. 8) on an interior surface thereof that receive a lower portion of the rear first filter and rear second filter, respectively. In the depicted embodiment rear upper frame structure 182 and rear lower frame structure 184 may have a substantially similar configuration.

Figure 8:
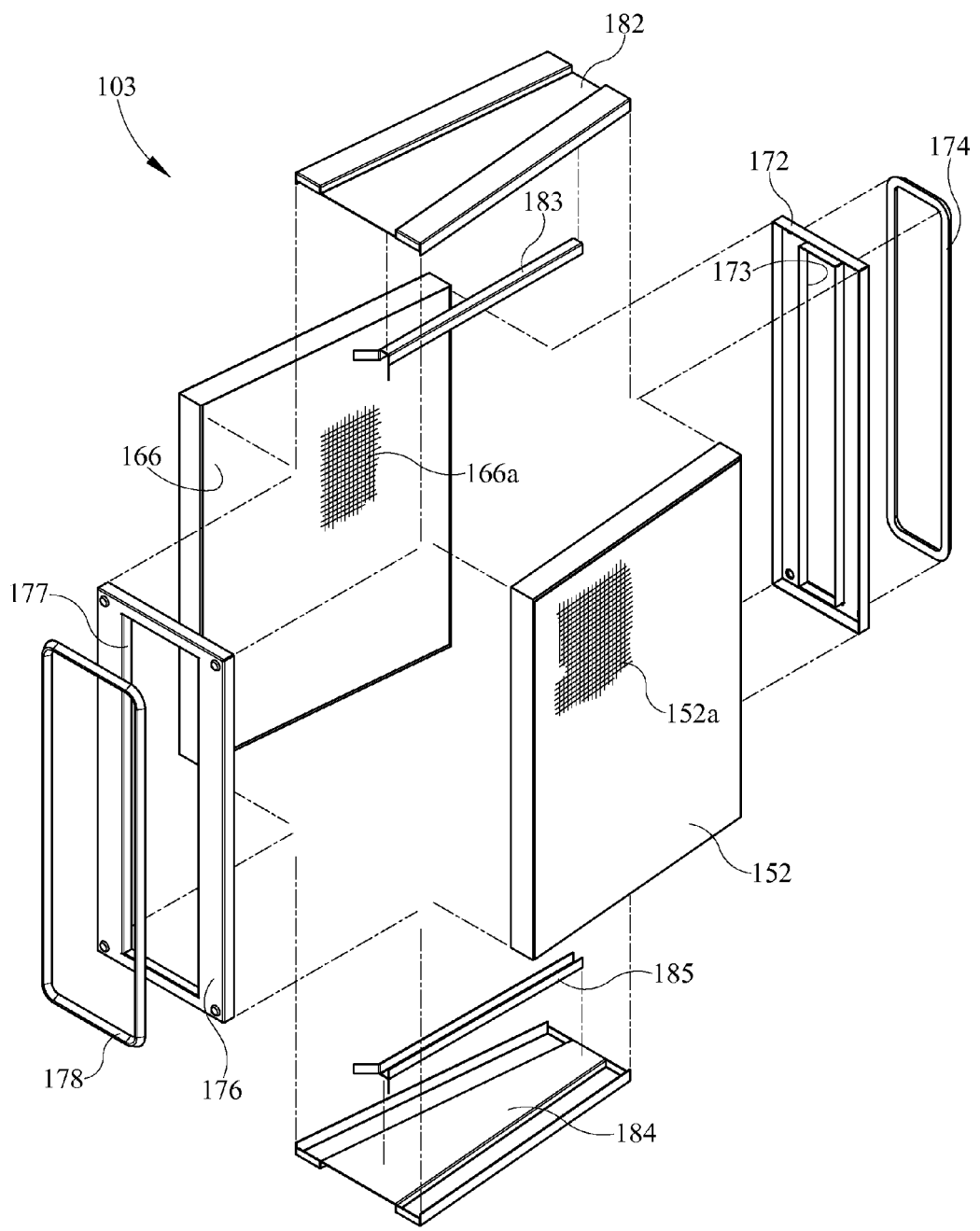
FIG. 8 illustrates an exploded rear upper perspective view of the rear portion of the first embodiment of a filter structure of FIG. 1.

The rear first end plate 172 extends over first ends of the rear first filter and the rear second filter and extends between the rear first and second filters. The rear first end plate 172 includes a rear first end plate air passageway opening 173 formed therein. The rear first end plate air passageway opening 173 has an interiorly extending flange therearound (FIG. 8). When rear frame portion 103 is assembled the first ends of the rear first filter and the rear second filter will be interposed between the interiorly extending flange of the rear first end plate air passageway opening 173 and a peripheral flange of the rear first end plate 172. A gasket 174 is provided around the rear first end plate air passageway opening 173. The gasket 174 is positioned so that when the front portion 101 and rear portion 103 are engaged with one another it sealingly engages the front second end plate 136 and places the front second end plate air passageway opening 137 and the rear first end plate air passageway opening 173 in communication with one another. As described in more detail herein, when the filter structure 100 is installed the front portion 101 and the rear portion 103 may collectively compress the gasket 174 to enhance the seal between the rear first end plate 172 and the front second end plate 136. In alternative embodiments a gasket may additionally or alternatively be provided on the front second end plate 136.

The rear second end plate 176 extends over second ends of the rear first filter and the rear second filter and extends between the rear first and second filters. The rear second end plate 176 includes a rear second end plate air passageway opening 177 formed therein. The rear second end plate air passageway opening 177 has an interiorly extending flange therearound. When rear filter portion 103 is assembled the second ends of the rear first filter and the rear second filter will be interposed between the interiorly extending flange of the rear second end plate air passageway opening 177 and a peripheral flange of the rear second end plate 176. A gasket 178 is provided around the rear second end plate air passageway opening 177.

The rear first filter, the rear second filter, the rear upper frame structure 182, and the rear lower frame structure 184 surround a rear air passageway 104. The rear first end plate air passageway opening 173 provides access to the rear air passageway 104 and provides for communication of air into and out of the rear air passageway 104. The rear first end plate air passageway opening 173 also provides for communication of air between the rear air passageway 104 and the front air passageway 102 when the front portion 101 and the rear portion 103 are engaged with one another. The rear second end plate air passageway opening 177 also provides access to the rear air passageway 104 and provides for communication of air into and out of the rear air passageway 104. The rear second end plate air passageway opening 177 also provides for communication of air between the rear air passageway 104 and a clean air intake opening when the filtering structure 100 is installed in an air filtering system. As described in additional detail herein, air may also be communicated to or from the rear air passageway 104 by moving through the rear first filter or the rear second filter.

The gasket 178 is positioned so that when the filter structure 100 is installed in a fluid filtering system the gasket 178 will sealingly engage a clean air intake opening, thereby placing the clean air intake opening in communication with the rear and front clean air passageways 104 and 102. As described in more detail herein, when the filter structure 100 is installed, the rear portion 103 and the clean air intake opening may compress the gasket 178 to enhance the seal between the rear second end plate 176 and the clean air intake opening.

Referring particularly to FIG. 7, a front upper track structure 143 is depicted that is coupled to an interior surface of front upper frame structure 142. A front lower track structure 145 is also depicted that is coupled to an interior surface of front lower frame structure 144. Referring particularly to FIG. 8, a rear upper track structure 183 is depicted that is coupled to an interior surface of rear upper frame structure 182. A rear lower track structure 185 is also depicted that is coupled to an interior surface of rear lower frame structure 184. The track structures 143, 183, 145, and 185 may be utilized to guide and/or secure the filter structure 100 in a fluid filtering system.

Figure 9:
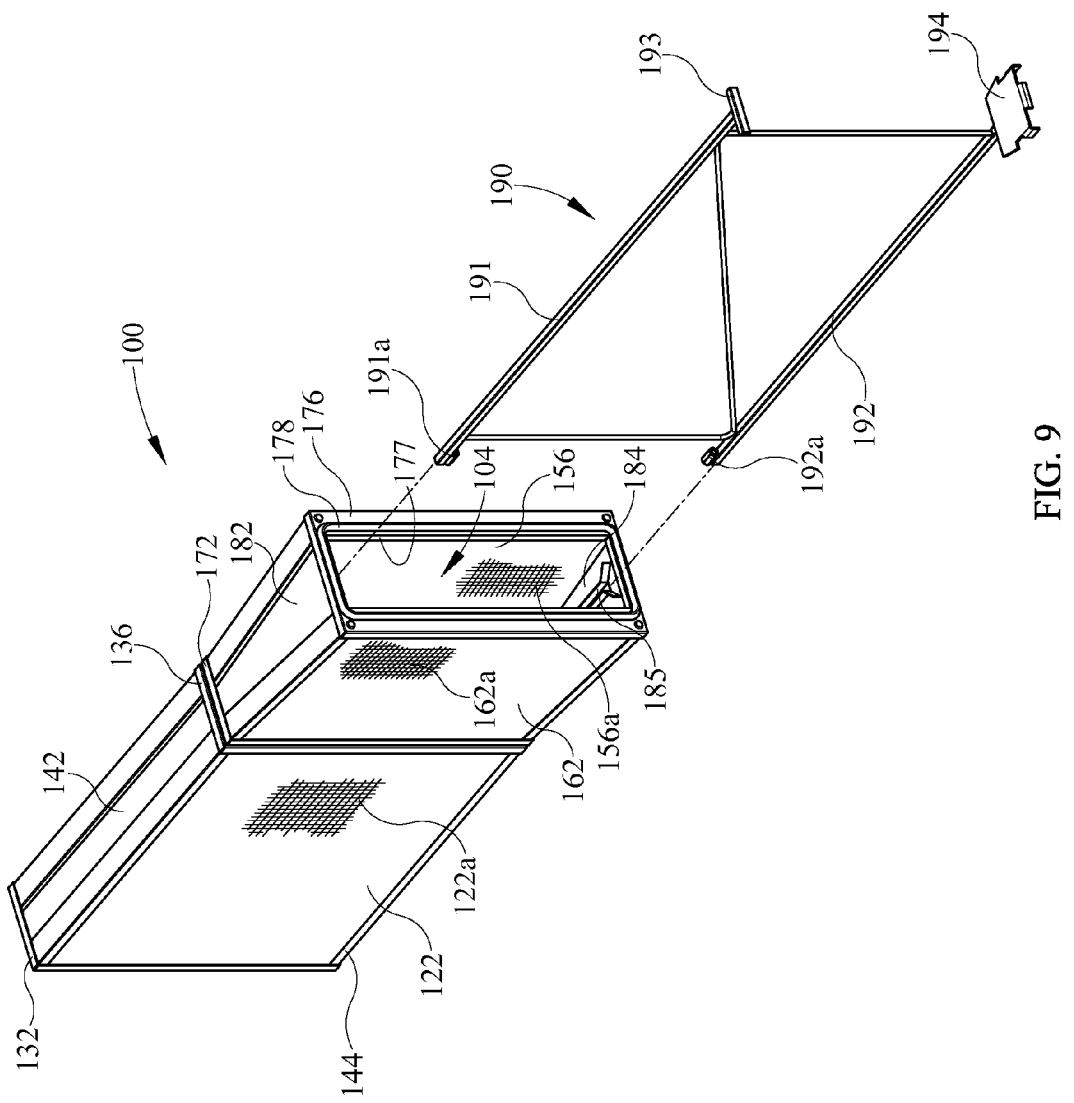
FIG. 9 illustrates an upper rear perspective view of the first embodiment of the filter structure of FIG. 1; a guide structure is also shown exploded away from track structure of the filter structure.
Figure 10:
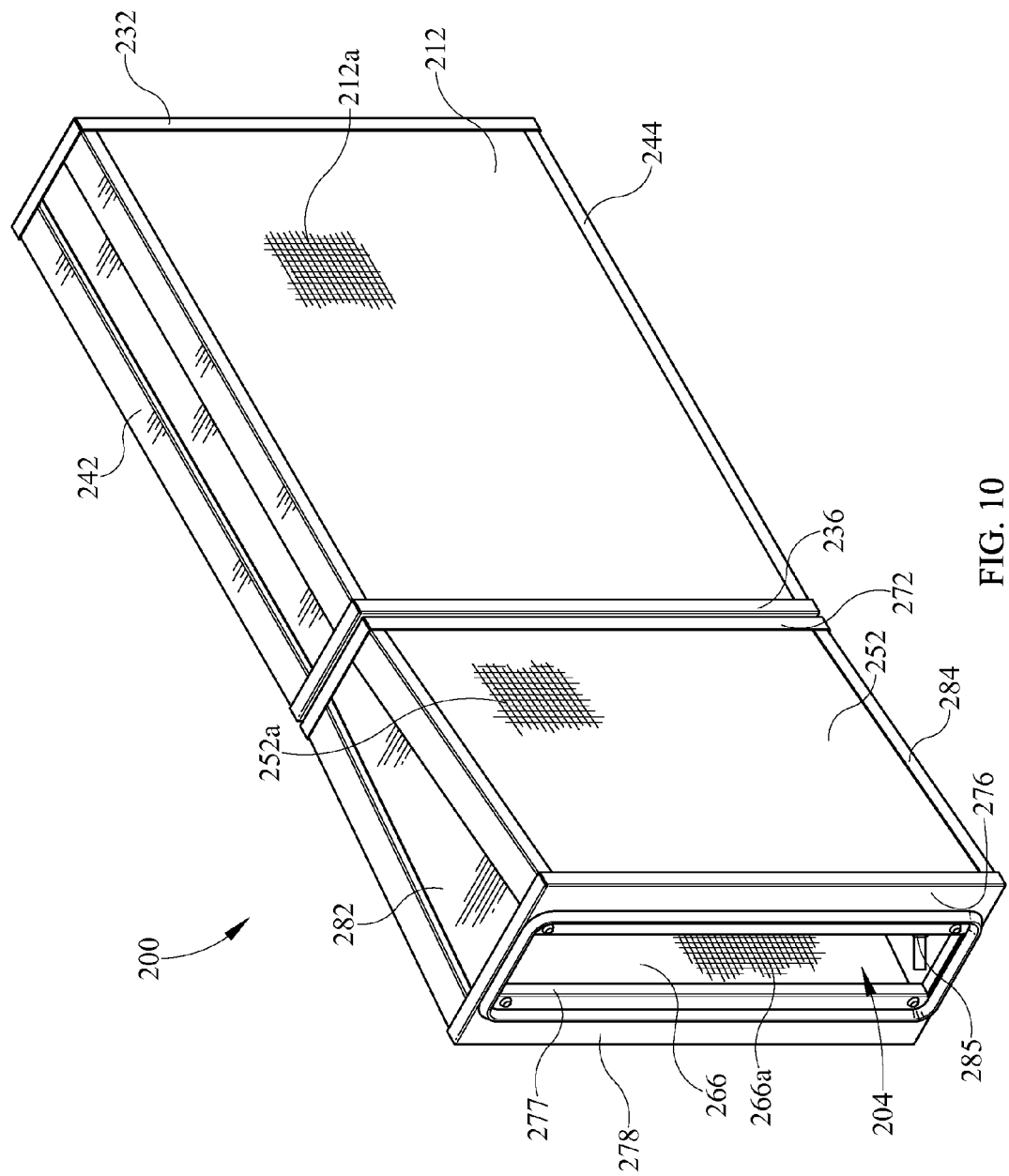
FIG. 10 illustrates an upper rear first side perspective view of a second embodiment of a filter structure.
Figure 11:
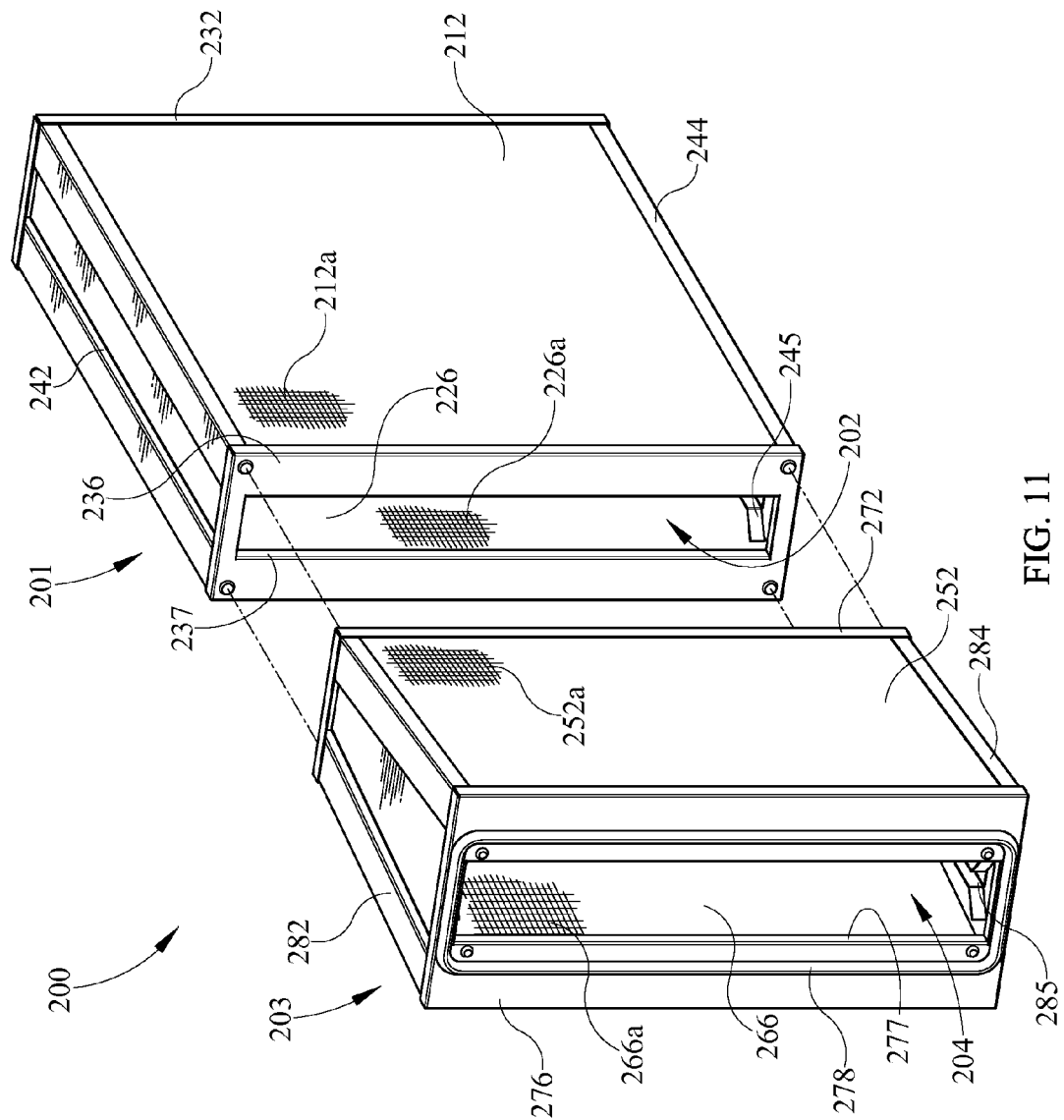
FIG. 11 illustrates an upper rear first side perspective view of the second embodiment of a filter structure of FIG. 10; a rear filter portion of the filter structure is shown exploded away from a front filter portion of the filter structure.
Figure 12B:
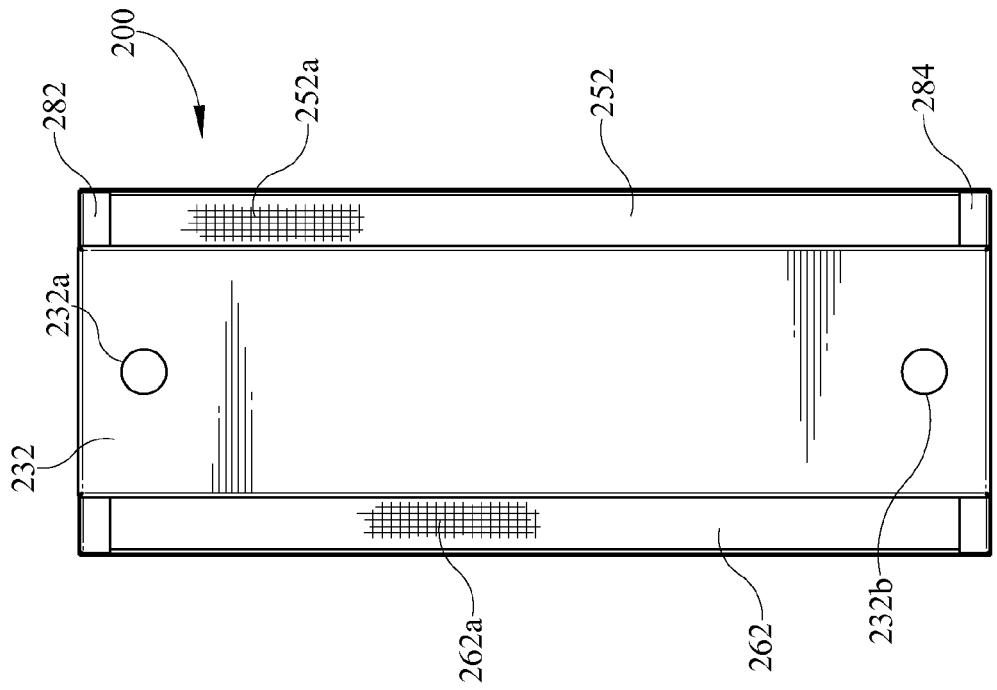
FIG. 12B illustrates a front plan view of the second embodiment of a filter structure of FIG. 10.
Figure 12A:
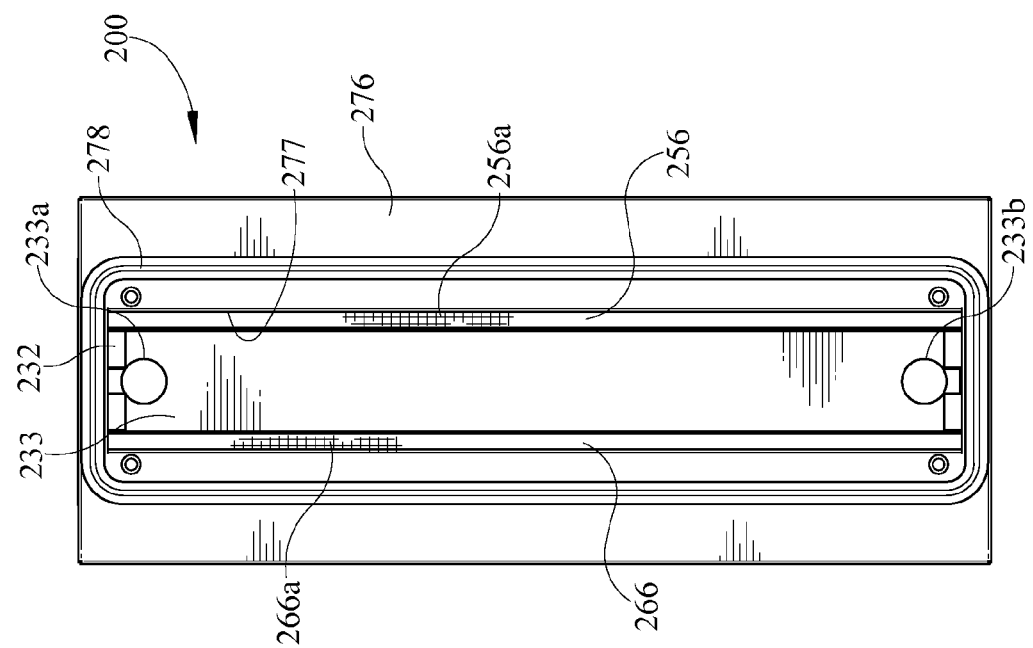
FIG. 12A illustrates a rear plan view of the second embodiment of a filter structure of FIG. 10.
Figure 13:
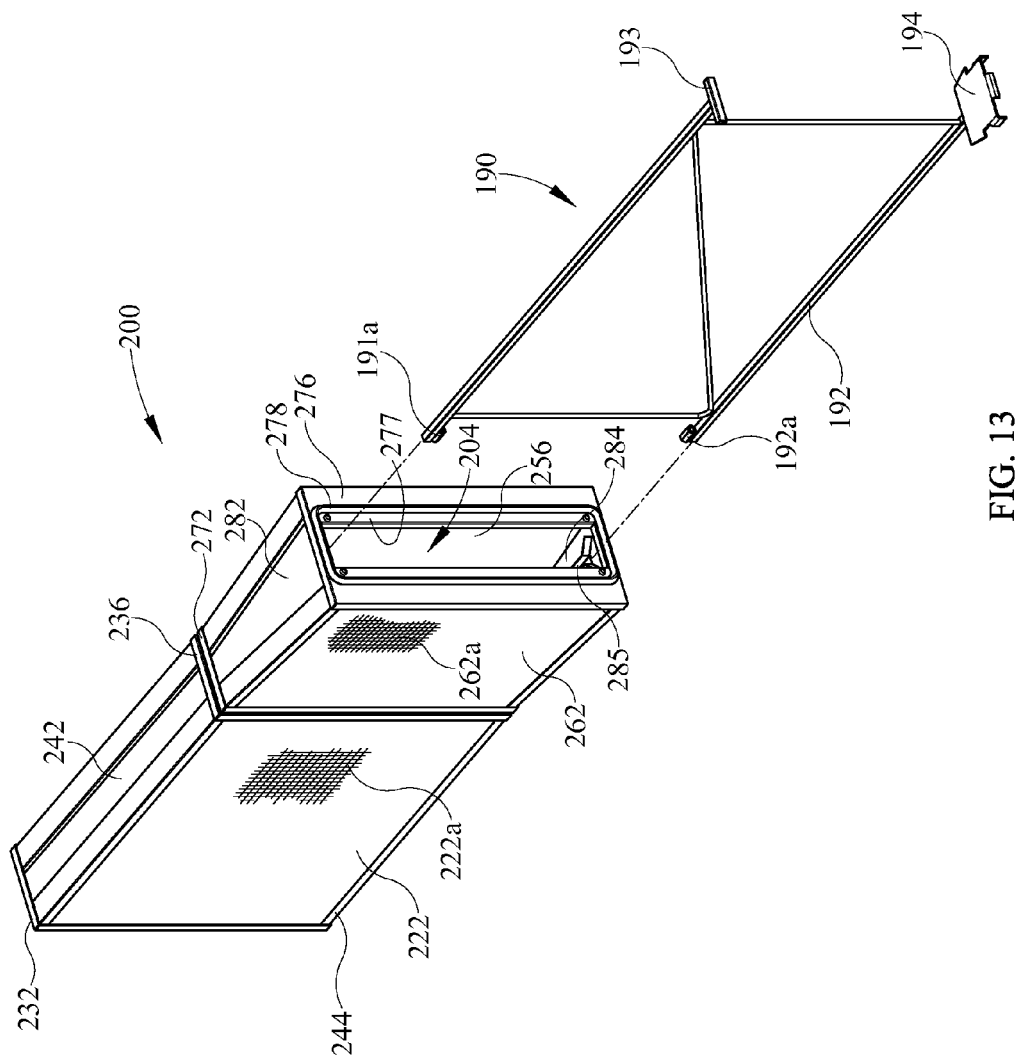
FIG. 13 illustrates an upper rear perspective view of the second embodiment of the filter structure of FIG. 10; a guide structure is also shown exploded away from track structure of the filter structure.

For example, referring particularly to FIG. 9, a guide structure 190 is depicted exploded away from the filter structure 100. The guide structure 190 includes an upper guide structure 191 that may be slidably received in front and rear upper track structure 143, 183 and also includes a lower guide structure 192 that may be slidably received in front and rear lower track structure 145, 185. A transverse coupling bar 193 and a coupling plate 194 are provided at a rear end of the guide structure 190 and may be utilized to couple the guide structure 190 adjacent a clean air intake opening within a fluid filtering system. The transverse coupling bar 193 and/or the coupling plate 194 may also define a portion of a clean air intake opening. An upper fastener receiver 191a and a lower fastener receiver 192a are provided at a front end of the guide structure 190. The upper fastener receiver 191a will align with opening 133a in front end plate spacer 133 and opening 132a in front first end plate 132 when first filter structure 100 is slidably received on guide structure 190. Likewise, the lower fastener receiver 192a will align with opening 133b in front end plate spacer 133 and opening 132b in front first end plate 132. Fasteners may then be inserted through openings 132a, 133a, 132b, and 133b and received in respective of fastener receiver 191a and 192a to thereby further secure filter structure 100 to guide structure 190. The fasteners may seal openings 132a, 133a, 132b, and 133b and optionally gasket washers and/or other materials may be used in combination with the fasteners in sealing openings 132a, 133a, 132b, and 133b. When the fasteners are received in the fastener receivers 191a and 192a, it may cause compressive force to be applied to gasket 178 by rear second end plate 176 and other structure of fluid filtering system (e.g., transverse coupling bar 193, or and/or structure adjacent a clean air intake opening). Moreover, it may cause compressive force to be applied on gasket 174 by front second end plate 136 and rear first end plate 172.

Optionally, when installing the filter structure 100 on the guide structure 190, the rear filter portion 103 may first be individually slidably received on the guide structure 190, then the front filter portion 101 may be individually slidably received on the guide structure 190. Likewise, the front filter portion 101 and the rear filter portion 103 may be individually removed from the guide structure 190. Although a separable rear filter portion 103 and front filter portion 101 are depicted in FIG. 1 through FIG. 9 in alternative embodiments rear filter portion 103 and front filter portion 101 may be inseparable. For example, in some embodiments rear filter portion 103 and front filter portion 101 may be permanently coupled to one another. Also, for example, one or more aspects of front filter portion 101 and rear filter portion 103 may be monolithically formed with one another. For example, front upper frame structure 142 and rear upper frame structure 182 may be monolithically formed with one another.

In some embodiments of the first filter structure 100, the filter media of the front first filter, the front second filter, the rear first filter, and/or the rear second filter may comprise a synthetic media. In versions of those embodiments the synthetic media may be Hollingsworth and Vose FA6900 NANOWEB® media. In some embodiments of the first filter structure 100, the filter media of the front first filter, the front second filter, the rear first filter, and/or the rear second filter may contain pleats having an average depth of approximately forty millimeters. The material may be, as an example, a composite of 60-80% by weight of melt blown polypropylene and 20-40% by weight of cellulose paper filtration layer. The composite may act as both an efficiency and dust loading layer.

In some embodiments the front first filter media and the front second filter media may share a substantially similar configuration. In some embodiments the rear first filter media and the rear second filter media may share a substantially similar configuration. Optionally, the configuration of the rear first filter media and the rear second filter media may be distinct in at least one respect from configuration of the front first filter media and the front second filter media.

For example, in some embodiments the rear first filter media and the rear second filter media may have a substantially similar first average pleat density and the front first filter media and the front second filter media may have a substantially similar second average pleat density that is distinct from the first average pleat density. For example, the rear first filter media and the rear second filter media may each have a pleat density of approximately thirty pleats per one hundred millimeters and the front first filter media and the front second filter media may each have a pleat density of approximately twenty-two pleats per one hundred millimeters. In other embodiments the rear first filter media and the rear second filter media may have a pleat density that is less than the pleat density of the front first filter media and the front second filter media. Also, for example, in some embodiments the rear first filter media and the rear second filter media may have a substantially similar first average grade or efficiency and the front first filter media and the front second filter media may have a substantially similar second average grade or efficiency that is distinct from the first average grade. Also, for example, in some embodiments the first filter structure 100 may have a first average pleat density over a first length thereof and a second average pleat density over a second length thereof. The first length may include all or portions of the front first and second filters and may optionally include portions of the rear first and second filters. Likewise, the second length may include all or portions of the rear first and second filters and may optionally include portions of the front first and second filters. Varying the pleat density and/or the grade of the media along the length of the first filter structure 100 may enable control of dust loading to certain sections of the media. For example, varying the pleat density and/or the grade of the media along the length of the first filter structure 100 may 'direct' more airflow into the rear filter portion 103.

When in use in a fluid filtering system, fluid to be filtered is drawn through the first filter structure 100 and into the air passageway thereof (which includes the front air passageway 102 and the rear air passageway 104). The fluid is drawn into the air passageway through the various filters of the first filter structure 100 and is filtered as it moves through the various filters. The geometric profile and/or the material configuration of the filters of the filter structure 100 may provide improved air flow distribution and/or improved contaminant loading characteristics in the filters. The geometric profile and/or the material configuration of the filters of the filter structure 100 may additionally or alternatively increase the internal effective differential pressure zone in at least the front filter portion 101. The geometric profile and/or the material configuration of the filters of the filter structure 100 may additionally or alternatively increase internal volumetric airflow in at least the front filter portion 101. The geometric profile and/or the material configuration of the filters of the filter structure may provide for efficiency of approximately ninety percent in some embodiments.

Upon the reaching of a certain condition in the fluid filtering system (e.g., a certain pressure being reached at one or more locations or a predetermined amount of time elapsing), one or more bursts of air may be emitted by the fluid filtering system into the filter structure 100 in an opposite direction from the typical flow of fluid to thereby cause reversal of the fluid flow moving through the filters (e.g., fluid flow exiting the air passageway through the filters of the first filter structure 100) and a sudden change in pressure. The burst(s) of air and/or change in pressure may cause the removal of contaminants accumulated on the upstream side of the filters. The geometric profile and/or the material configuration of the filters of the filter structure 100 may provide improved reverse air flow distribution that more strongly targets areas of the filters more likely loaded with contaminants during normal operation. For example, the geometric profile and/or the material configuration of the filters of the filter structure 100 may provide increased air distribution in the rear filter portion 103. The geometric profile and/or the material configuration of the filters of the filter structure 100 described herein may cause faster loading of contaminants on the upstream side of the filters but may also reduce the number of reverse air flow pulses necessary to remove contaminants from upstream sides of the filters.

In some embodiments the following elements of the first filter structure 100 may have approximately the hereinafter indicated dimensions. The rear second end plate air passageway opening 177 may be approximately 145 mm by 570 mm. The rear first end plate air passageway opening 173 may be approximately 92 mm by 570 mm. The front second end plate air passageway opening 137 may be approximately 92 mm by 570 mm. The front first filter and the front second filter may be approximately 754 mm (longitudinally) by 600 mm and may be approximately 42 mm thick. The rear first filter and the rear second filter may be approximately 605 mm (longitudinally) by 450 mm and may be approximately 42 mm thick.

Provided below in Table 1 is test data showing various test results for an embodiment of the first filter structure 100 utilizing the parameters of the ARAMCO 32-AMSS-008 testing method.

TABLE 1

| | |
|---|---|
| Initial System Resistance @ 100% Rated Flow | 0.47" w.g. @ 6876 m³/hr |
| Time to Reach Stabilized Differential Pressure of 2.5" w.g. | 9 hrs |
| Efficiency Rating | F9 |
| Stabilised System Differential Pressure - Phase 2 of ARAMCO Test | 2.1" w.g. |
| Time Taken To Reach 10" w.g. at 570 mg/m³ dust loading | 900 mins |
| Time Taken to Pulse Clean Back from 10" w.g. to within Normal Operating Range | 6.5 mins |

Provided below in Table 2 is test data showing differential pressure readings (in pascal) for an embodiment of the first filter structure 100 before pulse back cleaning commenced and after one, two, and three pulse backs. The test was conducted with a main flow set at approximately 127.9 m³/min, with no secondary flow, with relative humidity at approximately 40-50%, with a pulse manifold set at approximately 6.0 bar gauge, a pulse duration of approximately 100 ms, and an inter pulse duration of approximately 30 seconds.

TABLE 2

| | Differential Pressure (Pa) |
|---|---|
| Before Pulsing Commenced | 849.3 |
| After Pulse 1 | 623.2 |
| After Pulse 2 | 425.8 |
| After Pulse 3 | 320.2 |

Analyzing the data from Table 2, it can be recognized that a 26.6% decrease in differential pressure (compared to 849.3

Pa) was achieved after the first pulse back, a 49.9% decrease in differential pressure (compared to 849.3 Pa) was achieved after the second pulse back, and a 62.3% decrease in differential pressure (compared to 849.3 Pa) was achieved after the third pulse back.

Referring now to FIG. 10 through FIG. 13, various aspects of a second filter structure 200 are depicted. The second filter structure 200 shares a similar configuration as the first filter structure 100, but has a differently configured rear second end plate 276, differently sized rear second end plate opening 277, and differently sized gasket 278. Accordingly, description concerning many aspects of second filter structure 200 is omitted herein for purpose of conciseness. However, it is understood that those aspects of second filter structure 200 having numbering of 2XX share a common configuration with those aspects of first filter structure 100 having numbering of 1XX. For example, front upper frame structure 242 has a common configuration as front upper frame structure 142. Moreover, certain aspects of second filter structure 200 are not shown in FIG. 10 through FIG. 13, but it is understood that such aspects may share a similar configuration with aspects of first filter structure 100 shown in FIG. 1 through FIG. 9. For example, a front upper track structure coupled to the interior surface of front upper frame structure 242 is not visible in FIG. 10 though FIG. 13. However, it is understood that such front upper track structure may share a similar configuration with the front upper track structure 143. In some embodiments the rear second end plate opening 277 may have dimensions of approximately 92 mm by 570 mm. In some embodiments the rear second end plate opening 277 may be sized and configured to interface with a preexisting clean air intake opening, allowing second filter structure 200 to be utilized in a retrofit situation and replace preexisting filter structures. A smaller rear second end plate opening 277 may cause differential pressure to increase as compared to first filter structure 100. A smaller rear second end plate opening 277 may also reduce rated airflow as compared to first filter structure 100.

Provided below in Table 3 is test data showing various test results for an embodiment of the second filter structure 200 utilizing the ARAMCO 32-AMSS-008 testing method.

TABLE 3

| | |
|---|---|
| Initial System Resistance @ 100% Rated Flow | 0.65" w.g. @ 6881 m³/hr |
| Time to Reach Stabilized Differential Pressure of 2.5" w.g. | 5.5 hrs |
| Efficiency Rating | F9 |
| Stabilised System Differential Pressure - Phase 2 of ARAMCO Test | 1.9" w.g. |
| Time Taken To Reach 10" w.g. at 570 mg/m³ dust loading | 800 mins |
| Time Taken to Pulse Clean Back from 10" w.g. to within Normal Operating Range | 6 mins |

Provided below in Table 4 is test data showing differential pressure readings (in pascal) for an embodiment of the second filter structure 200 before pulse back cleaning commenced and after one, two, three, four, five, and six pulse backs. The test was conducted with a main flow set at approximately 127.9 m³/min, with no secondary flow, with relative humidity at approximately 40-50%, with a pulse manifold set at approximately 6.0 bar gauge, a pulse duration of approximately 100 ms, and an inter pulse duration of approximately 30 seconds.

TABLE 4

| | Differential Pressure (Pa) |
|---|---|
| Before Pulsing Commenced | 851.0 |
| After Pulse 1 | 765.5 |
| After Pulse 2 | 657.5 |
| After Pulse 3 | 551.5 |
| After Pulse 4 | 537.5 |
| After Pulse 5 | 516.5 |
| After Pulse 6 | 506.5 |

Analyzing the data from Table 4 it can be recognized that a 10% decrease in differential pressure (compared to 851.0 Pa) was achieved after the first pulse back, a 22.7% decrease in differential pressure (compared to 851.0 Pa) was achieved after the second pulse back, a 35.2% decrease in differential pressure (compared to 851.0 Pa) was achieved after the third pulse back, a 36.8% decrease in differential pressure (compared to 851.0 Pa) was achieved after the fourth pulse back, a 39.3% decrease in differential pressure (compared to 851.0 Pa) was achieved after the fifth pulse back, and a 40.5% decrease in differential pressure (compared to 851.0 Pa) was achieved after the sixth pulse back.

Figure 14:
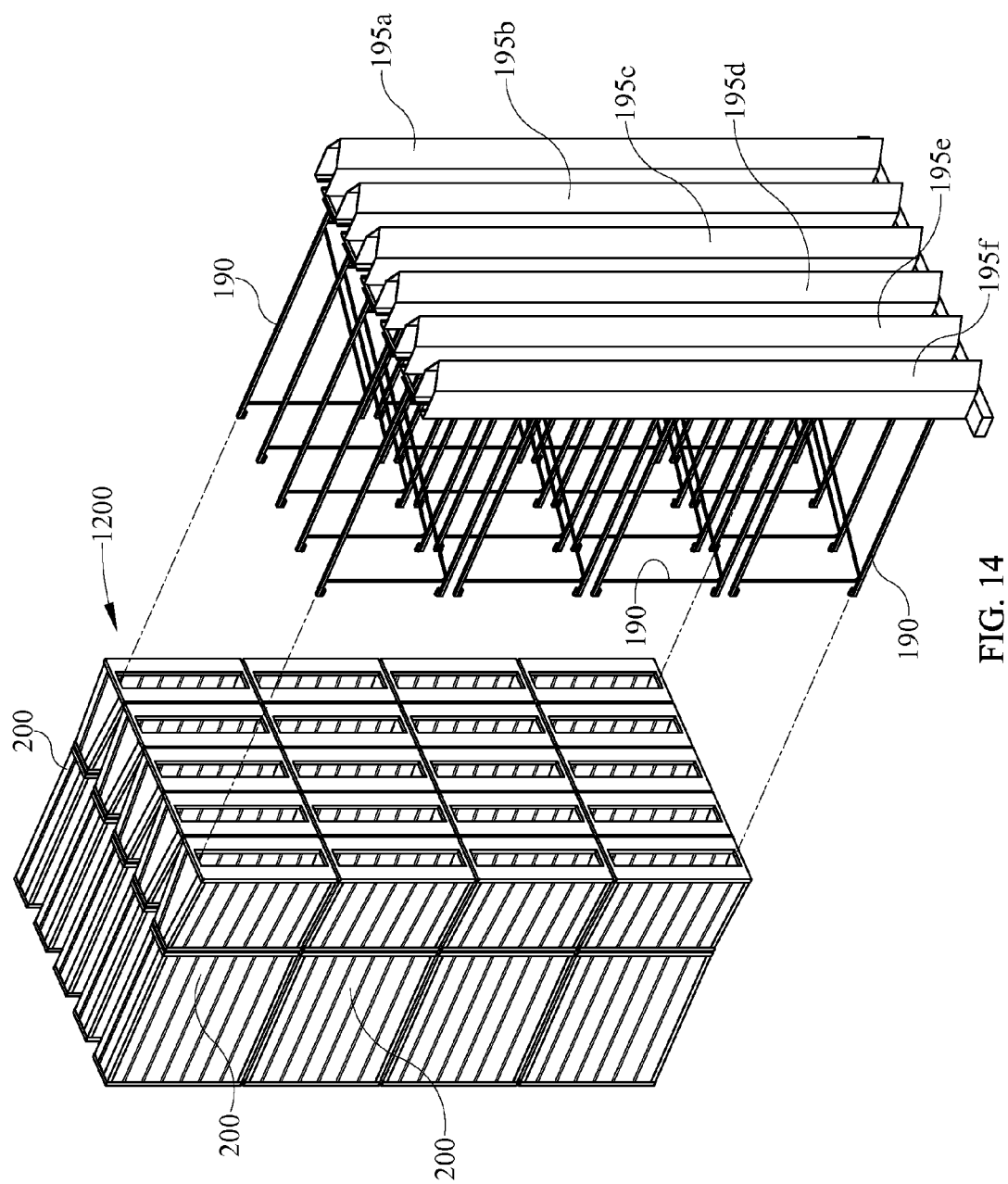
FIG. 14 illustrates an upper rear perspective view of aspects of a gas filtering system that incorporates a plurality of the second embodiment of the filter structures of FIG. 2; the plurality of filter structures are depicted exploded away from a plurality of guide structures extending from vertical secondary air ducts; the secondary air ducts form clean air intakes therebetween.

Referring now to FIG. 14 through FIG. 17, a bank 1200 of the second filter structures 200 are depicted implemented in combination with other aspects of a gas filtering system. Twenty of second filter structures 200 are included in the bank 1200. In FIG. 14 the bank 1200 is shown exploded away from twenty guide structures 190 that are coupled to six secondary air ducts 195a-f. The secondary air ducts 195a-f form clean air passageways therebetween. For example, a clean air passageway is formed between a first secondary air duct 195a and a second secondary air duct 195b. Moreover, each of the secondary air ducts surround and define a secondary air passageway. The secondary air passageways may be utilized in combination with the pulse back cleaning described herein to draw contaminants dislodged from the upstream side of the filter structures 200 into the secondary air passageways and into a secondary air circuit where the dislodged contaminants are discharged to an exterior area. The transverse coupling bar 193 and/or the coupling plate 194 may also optionally define a portion of a clear air intake opening.

Each of the guide structures 190 is coupled to two of the secondary air ducts 195a-f such that when a second filter structure 200 is inserted thereon, the second end plate opening 277 of the second filter structure 200 will be aligned with a clean air passageway formed between the two of secondary air ducts 195a-f. Moreover, upstream faces of each of the filter structures 200 will be in flow communication with at least one of the secondary air passageways of the secondary air ducts 195a-f to enable contaminants removed therefrom during pulse back cleaning to be drawn into the secondary air passageway.

Figure 15:
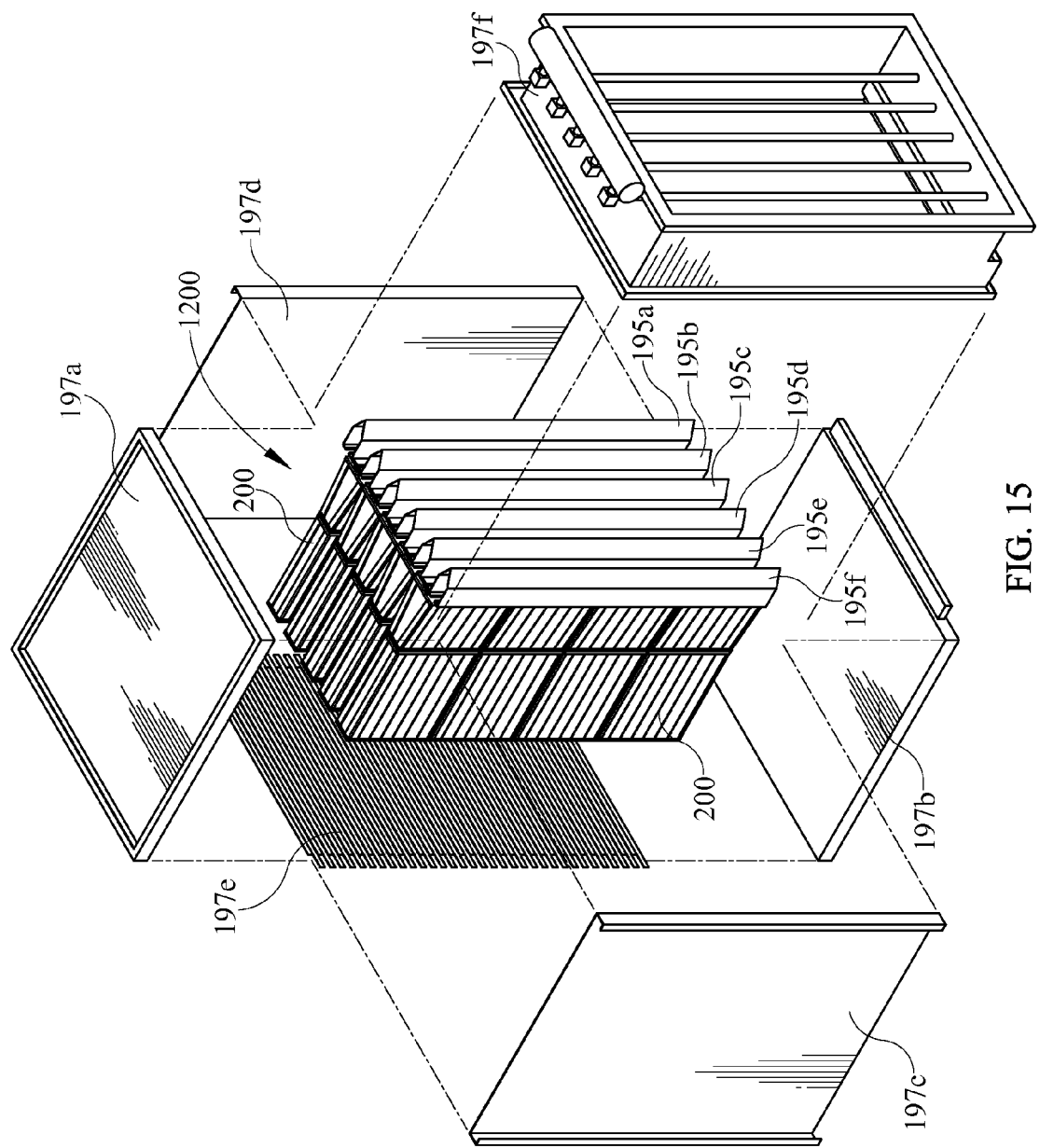
FIG. 15 illustrates an upper rear perspective view of the aspects of a gas filtering system of FIG. 14; each of the filter structures is depicted slidably received on one of the guide structures and is in communication with one of the clean air passageways; panels of an air filtering housing are also depicted exploded away from one another.
Figure 16:
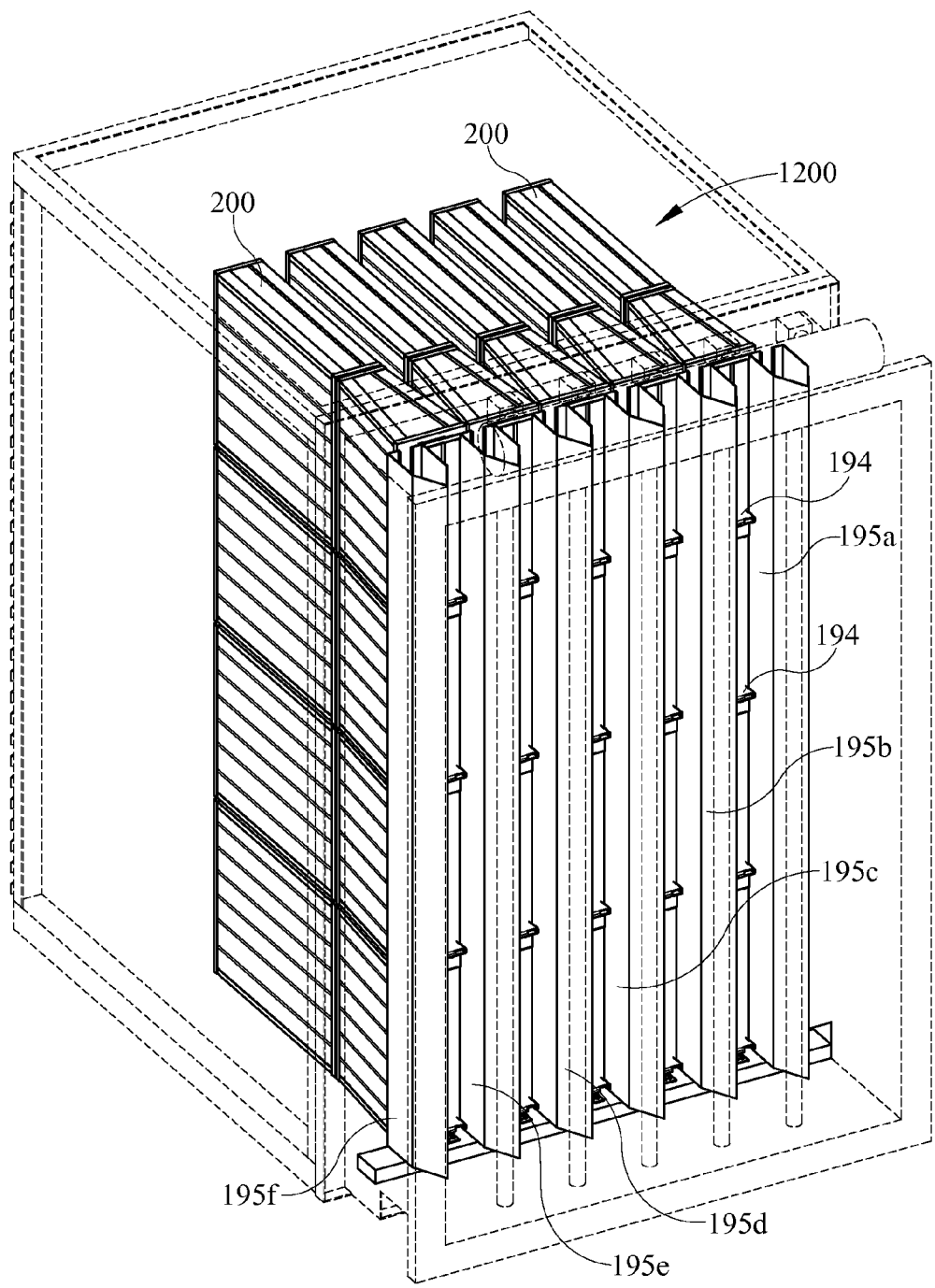
FIG. 16 illustrates an upper rear perspective view of the aspects of a gas filtering system of FIG. 14 and illustrates the panels of an air filtering housing of FIG. 15; the panels of an air filtering housing are depicted unexploded and in phantom.
Figure 17:
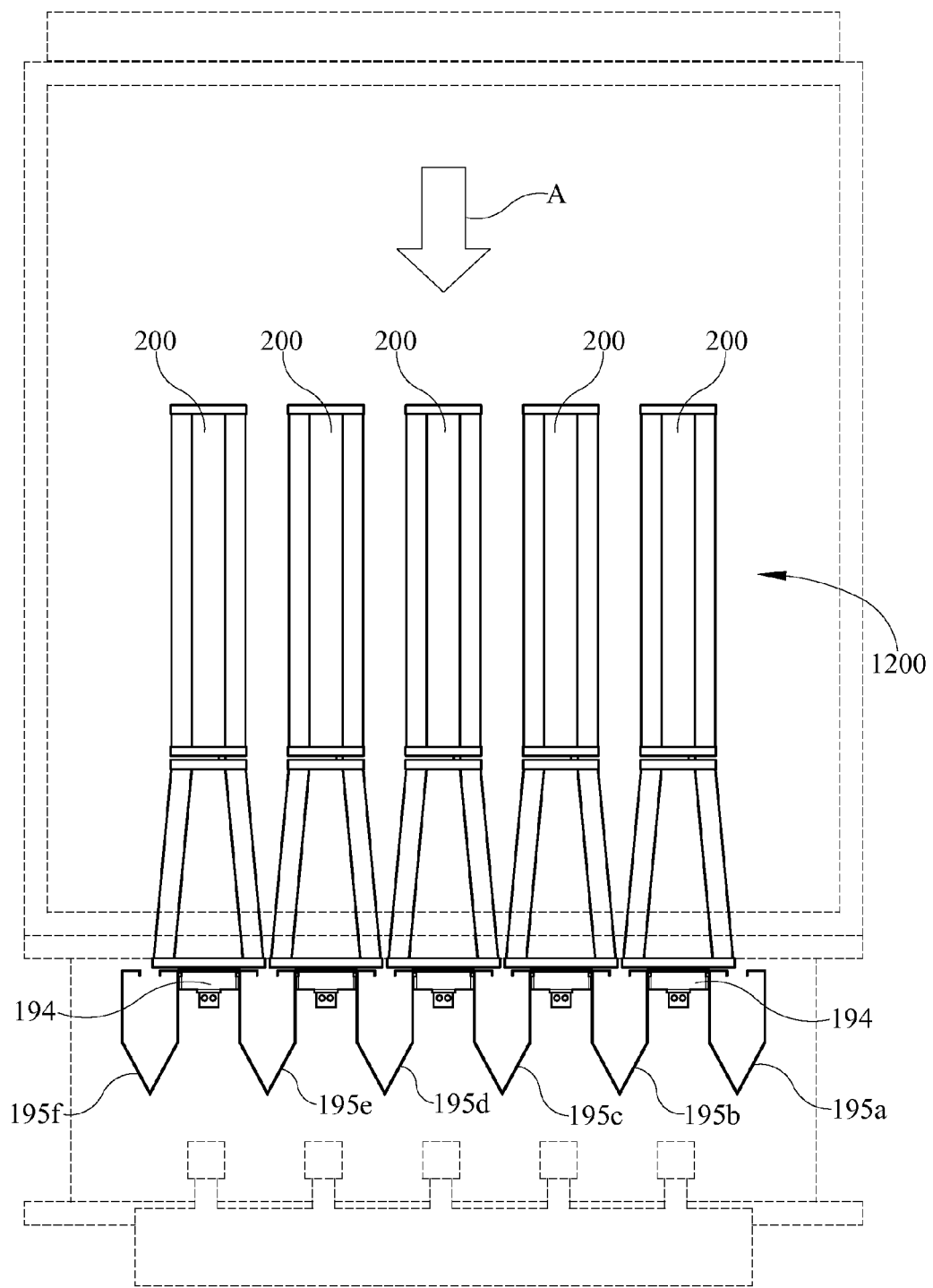
FIG. 17 illustrates a top view of the aspects of a gas filtering system of FIG. 14 and illustrates the panels of an air filtering housing of FIG. 15; the panels of an air filtering housing are depicted in phantom.

In FIG. 15 through FIG. 17 various pieces of a gas filtering housing are shown exploded away from one another and surrounding the bank 1200. The gas filtering housing includes a permeable intake piece 197e for drawing in unfiltered air (indicated generally by arrow A in FIG. 17) and an opposite clean air outtake piece 197f for interfacing with the clean air passageways to deliver clean filtered air downstream to a gas turbine. The gas filtering housing also includes non-permeable side pieces 197c and 197d and non-permeable top and bottom pieces 197a and 197b. The gas filtering housing is shown in phantom in FIG. 16 and FIG. 17 to enable a better understanding of the interface between the bank 1200 of second filter structures 200 and the other aspects of the gas filtering system.

In some embodiments, aspects of the frame structure of the filter structures 100 and 200 described herein may comprise pre-galvanized mild steel with a powder coating of approximately 40 micron or greater and material thickness of 1 mm or greater.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A filter structure for removing contaminants from a stream of fluid, comprising:
    a generally rectangular front filter portion and a generally trapezoidal rear filter portion;
    said front filter portion including front frame structure supporting a first front filter and a second front filter in substantially parallel spaced relation to one another; said front frame structure, said first front filter, and said second front filter substantially surrounding a front clean air passageway;
    said rear filter portion including rear frame structure supporting a first rear filter and a second rear filter in substantially divergent spaced relation with one another; a less spaced end of said first rear filter and said second rear filter being proximal said front filter portion and a more spaced end of said first rear filter and said second rear filter being distal said front filter portion; said rear frame structure, said first rear filter, and said second rear filter substantially surrounding a rear clean air passageway;
    wherein said rear clean air passageway is in communication with said front clean air passageway and in communication with a filter structure outlet between said first rear filter and said second rear filter proximal said more spaced end of said first rear filter and said second rear filter.

2. The filter structure of claim 1, wherein said front first filter and said rear first filter contain at least some unified structure.

3. The filter structure of claim 2, wherein said front frame and said rear frame contain at least some unified structure.

4. The filter structure of claim 1, wherein said front first filter and said front second filter share a substantially similar first material configuration and said rear first filter and said rear second filter share a substantially similar second material configuration distinct from said first material configuration.

5. The filter structure of claim 4, wherein said first material configuration has a first average pleat density and said second material configuration has a second average pleat density, said second average pleat density at least ten percent more dense than said first average pleat density.

6. The filter structure of claim 4, wherein said first material configuration has a first average pleat density and said second material configuration has a second average pleat density, said second average pleat density at least ten percent less dense than said first average pleat density.

7. The filter structure of claim 4, wherein said first material configuration has a first grade and said second material configuration has a second grade distinct from said first grade.

8. The filter structure of claim 4, wherein said front filter portion and said rear filter portion are separable from one another.

9. A filter structure for removing contaminants from a stream of fluid, comprising:
a front filter portion defining a front clean air passageway therein, said front filter portion having a first front filter and a second front filter flanking said front clean air passageway, said first front filter and said second front filter being at a first orientation relative to one another;
a rear filter portion downstream of said front filter portion, said rear filter portion defining a rear clean air passageway therein, said rear clean air passageway being in flow communication with said front clean air passageway, said rear filter portion having a first rear filter and a second rear filter flanking said rear clean air passageway, said first rear filter and said second rear filter being at a second orientation relative to one another;
wherein said second orientation is distinct from said first orientation; and
wherein said second orientation is a diverging orientation wherein said first rear filter and said second rear filter are more proximal one another adjacent said front filter portion.

10. The filter structure of claim 9, wherein said front first filter and said front second filter share a substantially similar first average pleat density and said rear first filter and said rear second filter share a substantially similar second average pleat density distinct from said first average pleat density.

11. The filter structure of claim 10, wherein said second average pleat density is at least fifteen percent more dense than said first average pleat density.

12. The filter structure of claim 10, wherein said second average pleat density is at least twenty-five percent more dense than said first average pleat density.

13. The filter structure of claim 9, wherein said front filter portion and said rear filter portion contain at least some unified structure.

14. The filter structure of claim 9, wherein said first orientation is a substantially parallel orientation.

15. A fluid filtering system, comprising:
a plurality of filter structures interposed between an unfiltered fluid intake area and a filtered fluid output area;
said filter structures having an air passageway therein flanked by a first side filter portion and a second side filter portion, said air passageway being in communication with said filtered fluid output area;
wherein said first side filter portion and said second side filter portion allow communication of fluid therethrough both into and out of said air passageway;
said first side filter portion and said second side filter portion having a substantially parallel orientation with respect to one another along a first length and having a substantially diverging orientation with respect to one another along a second length;
wherein said first length is more distal said filtered fluid output area than said second length; and
wherein along said second length said first side filter portion and said second side filter portion become more divergent as they become more proximal said filtered fluid output area.

16. The fluid filtering system of claim 15, wherein said first side filter portion includes a front filter portion along said first length that is non-unified with a rear filter portion along said second length.

17. The fluid filtering system of claim 15, wherein said first filter and said second filter share a substantially similar first average pleat density along at least a portion of said first length and said first filter and said second filter share a substantially similar second average pleat density along at least a portion of said second length, said second average pleat density distinct from said first average pleat density.

18. The fluid filtering system of claim 17, wherein said second average pleat density is at least twenty percent more dense than said first average pleat density.

19. The fluid filtering system of claim 15, wherein said filter structures are separable into a front filter structure that includes said first length and a rear filter structure that includes said second length.

20. The fluid filtering system of claim 15 further comprising at least one secondary air circuit opening provided between two side by side said filter structures.

* * * * *